(12) United States Patent
Kim et al.

(10) Patent No.: US 9,674,448 B2
(45) Date of Patent: Jun. 6, 2017

(54) MOBILE TERMINAL AND METHOD FOR CONTROLLING THE SAME

(71) Applicant: LG ELECTRONICS INC., Seoul (KR)

(72) Inventors: Sujin Kim, Seoul (KR); Sunghye Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/968,687

(22) Filed: Dec. 14, 2015

(65) Prior Publication Data

US 2017/0041549 A1 Feb. 9, 2017

(30) Foreign Application Priority Data

Aug. 3, 2015 (KR) .................. 10-2015-0109667

(51) Int. Cl.
*H04N 5/232* (2006.01)
*G06F 3/0484* (2013.01)

(52) U.S. Cl.
CPC ..... *H04N 5/23293* (2013.01); *G06F 3/04842* (2013.01); *G06F 3/04845* (2013.01); *H04N 5/23216* (2013.01)

(58) Field of Classification Search
CPC ............ H04N 5/23293; H04N 5/23216; G06F 3/04842; G06F 3/04845
USPC .................................... 348/333.02
See application file for complete search history.

(56) References Cited

U.S. PATENT DOCUMENTS

| 7,286,161 B2* | 10/2007 | Watanabe | H04N 5/23293 348/207.2 |
| 8,493,450 B2* | 7/2013 | Shiraiwa | H04N 1/00 348/207.2 |
| 2003/0156197 A1* | 8/2003 | Watanabe | H04N 5/23293 348/207.2 |
| 2006/0146363 A1* | 7/2006 | Choi | H04N 1/00278 358/1.15 |
| 2007/0223046 A1* | 9/2007 | Shiraiwa | H04N 1/00 358/296 |

(Continued)

FOREIGN PATENT DOCUMENTS

| EP | 2765767 | 8/2014 |
| EP | 2852135 | 3/2015 |

(Continued)

OTHER PUBLICATIONS

European Patent Application No. 15197564.6, Search Report dated Dec. 12, 2016, 26 pages.

*Primary Examiner* — Pritham Prabhakher
(74) *Attorney, Agent, or Firm* — Lee, Hong, Degerman, Kang & Waimey

(57) ABSTRACT

The present invention relates to a mobile terminal providing an image printed out through a photo printer and related information, and a method of controlling the same. The mobile terminal includes a memory, a camera, a display; and a controller configured to cause the display to display a preview image of image data received via the camera and cause the display to display an indicator indicating that an image object included in the preview image corresponds to a specific image stored in the memory when the image object corresponds to the specific image, wherein the specific image has been previously printed out via a printer device.

18 Claims, 24 Drawing Sheets

(56) References Cited

U.S. PATENT DOCUMENTS

| | | | |
|---|---|---|---|
| 2013/0222305 A1* | 8/2013 | Kanno | G06F 3/0484 345/173 |
| 2014/0092426 A1* | 4/2014 | Fujishita | G06K 15/005 358/1.15 |
| 2014/0113683 A1 | 4/2014 | Hickey | |
| 2016/0004402 A1* | 1/2016 | Yoshida | H04N 1/00196 715/784 |

FOREIGN PATENT DOCUMENTS

| | | |
|---|---|---|
| JP | H1091634 | 4/1998 |
| JP | 2010176287 | 8/2010 |
| WO | 0124050 | 4/2001 |
| WO | 03094545 | 11/2003 |

\* cited by examiner

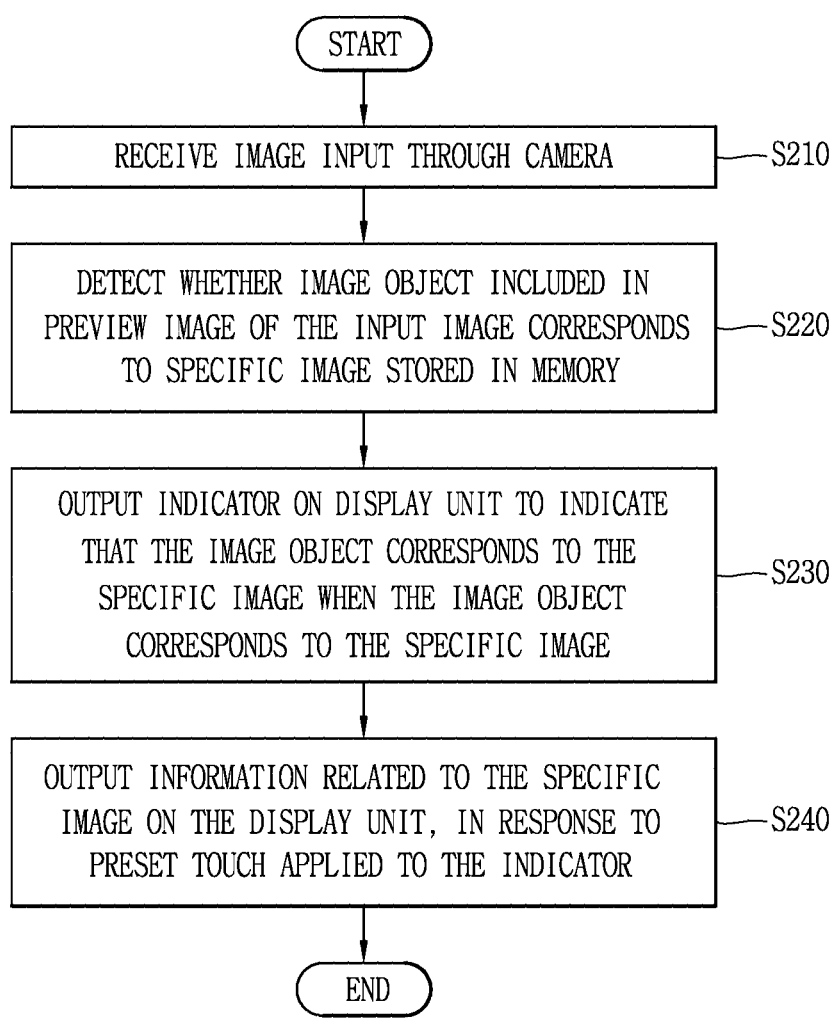

FIG. 6A
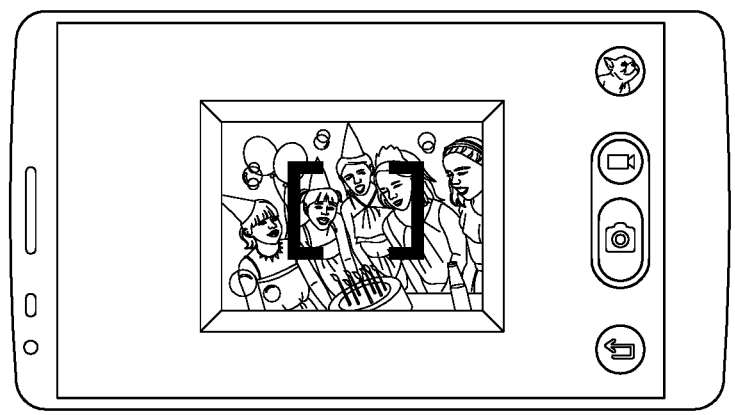

FIG. 7B
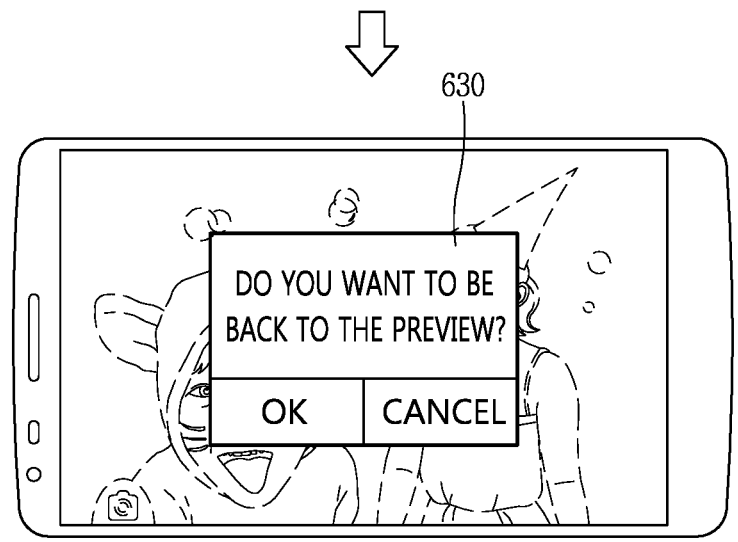

MOBILE TERMINAL AND METHOD FOR CONTROLLING THE SAME

CROSS-REFERENCE TO RELATED APPLICATION

Pursuant to 35 U.S.C. §119(a), this application claims the benefit of earlier filing date and right of priority to Korean Patent Application No. 10-2015-0109667, filed on Aug. 3, 2015, the contents of which is incorporated by reference herein in its entirety.

BACKGROUND OF THE INVENTION

1. Field of the Invention

This specification relates to a mobile terminal capable of providing information related to an image printed by a photo printer, and a method for controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

Meanwhile, with development of a camera function of a mobile terminal, methods of utilizing images captured through a camera of the mobile terminal in various manners are under development. As one of such development, an external device called a photo printer has been developed by which an image stored in a mobile terminal is printed on a printing paper (or a photographic paper) merely through wireless communication with the mobile terminal. A user can thus keep important images in a printed form.

Accordingly, the present invention proposes a method of providing a user with information related to an image which the user considers important and thus keeps in the form of a printed image.

SUMMARY OF THE INVENTION

Therefore, an aspect of the detailed description is to provide a mobile terminal capable of providing information related to an image in a printed form.

Another aspect of the detailed description is to provide additional functions associated with an image in a printed shape or state.

To achieve these and other advantages and in accordance with the purpose of this specification, as embodied and broadly described herein, there is provided a mobile terminal including a memory, a camera, a display and a controller configured to cause the display to display a preview image of image data received via the camera and cause the display to display an indicator indicating that an image object included in the preview image corresponds to a specific image stored in the memory when the image object corresponds to the specific image, wherein the specific image has been previously printed out via a printer device.

In accordance with one embodiment, the controller is further configured to cause the display to display information related to the specific image in response to a touch applied to the indicator.

In accordance with one embodiment, the information includes at least one of captured place information, captured time information, photo memo information, an image having captured place information that is similar to or same as captured place information of the specific image, an image having captured time information that is similar to or same as captured time information of the specific image, or an image that has been printed out via the printer device.

In accordance with one embodiment, the controller is further configured to cause the display to display the information in a size that is set based on a length of the touch applied to the indicator.

In accordance with one embodiment, the controller is further configured to cause the display to display the information and the preview image simultaneously.

In accordance with one embodiment, the controller is further configured to cause the display to display the information, but to not display the preview image when a second touch is applied to the indicator by a predetermined length while both the information and the preview image are displayed.

In accordance with one embodiment, the controller is further configured to cause the display to display a graphic object indicating the preview image at one area of the displayed information.

In accordance with one embodiment, the information includes information related to a plurality of images; and the controller is further configured to cause the display to display one of the plurality of images in place of the preview image when the information is displayed on the display.

In accordance with one embodiment, the controller is further configured to cause the display to display a second image among the plurality of images in response to a flicking input applied to the one of the plurality of images that is different from the second image.

In accordance with one embodiment, the touch is a downward drag touch applied on the display, the information relates to a plurality of images and the controller is further configured to cause the display to display the indicator moving to select one of the plurality of images in response to a drag input applied to the indicator from one side to another side, the drag input applied while the plurality of images are displayed.

In accordance with one embodiment, the controller is further configured to cause the display to display additional information related to the selected one of the plurality of images that is located at a position corresponding to a moved position of the dragged indicator.

In accordance with one embodiment, the controller is further configured to recognize the image object as a product printed out via the printer device when the image object includes identification information relating to the specific image.

In accordance with one embodiment, the controller is further configure to cause the display to display a plurality of thumbnail images corresponding to a plurality of images stored in the memory and cause the display to display a graphic object indicating presence of printing history information on at least one of the plurality of thumbnail images that corresponds to at least one of the plurality of images having the printing history information, the printing history information indicating that the at least one of the plurality of images has been previously printed out via the printer device.

In accordance with one embodiment, the controller is further configured to cause the display to display only one of the at least one of the plurality of thumbnail image in response to a touch applied to the graphic object displayed on the one of the at least one of the plurality of thumbnail images.

In accordance with one embodiment, the controller is further configured to cause the display to display a function list including items corresponding to additional functions associated with the printer device in response to a touch applied to the displayed graphic object.

In accordance with one embodiment, the controller is further configured to cause the display to display an image corresponding to one of the plurality of thumbnail images on which the graphic object is displayed in response to a touch applied to the graphic object, the image displayed in a printed format.

In accordance with one embodiment, the method comprising, receiving image data via a camera, displaying, on a display, a preview image of the image data, the preview image including an image object that corresponds to a specific image stored in a memory, displaying an indicator indicating that the image object corresponds to the specific image and displaying information related to the specific image in response to a touch applied to the indicator.

In accordance with one embodiment, the specific image has been previously printed out via a printer device.

In accordance with one embodiment, the displaying of the information comprises displaying the information in a size that is set based on a length of the touch applied to the indicator.

In accordance with one embodiment, the information and the preview image are displayed simultaneously.

In accordance with one embodiment, the displaying the information related to the specific image may include outputting both of the preview image and the information related to the specific image on the display unit.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 2 is a flowchart illustrating a method of providing information related to an image printed out through a photo printer in a mobile terminal in accordance with the present invention;

FIGS. 6A, 6B, 7A and 7B are conceptual views illustrating a method of executing a different function, in response to a different type of touch applied to information related to a specific image, when the information related to the specific image is provided;

DETAILED DESCRIPTION OF THE INVENTION

Figure 1A:
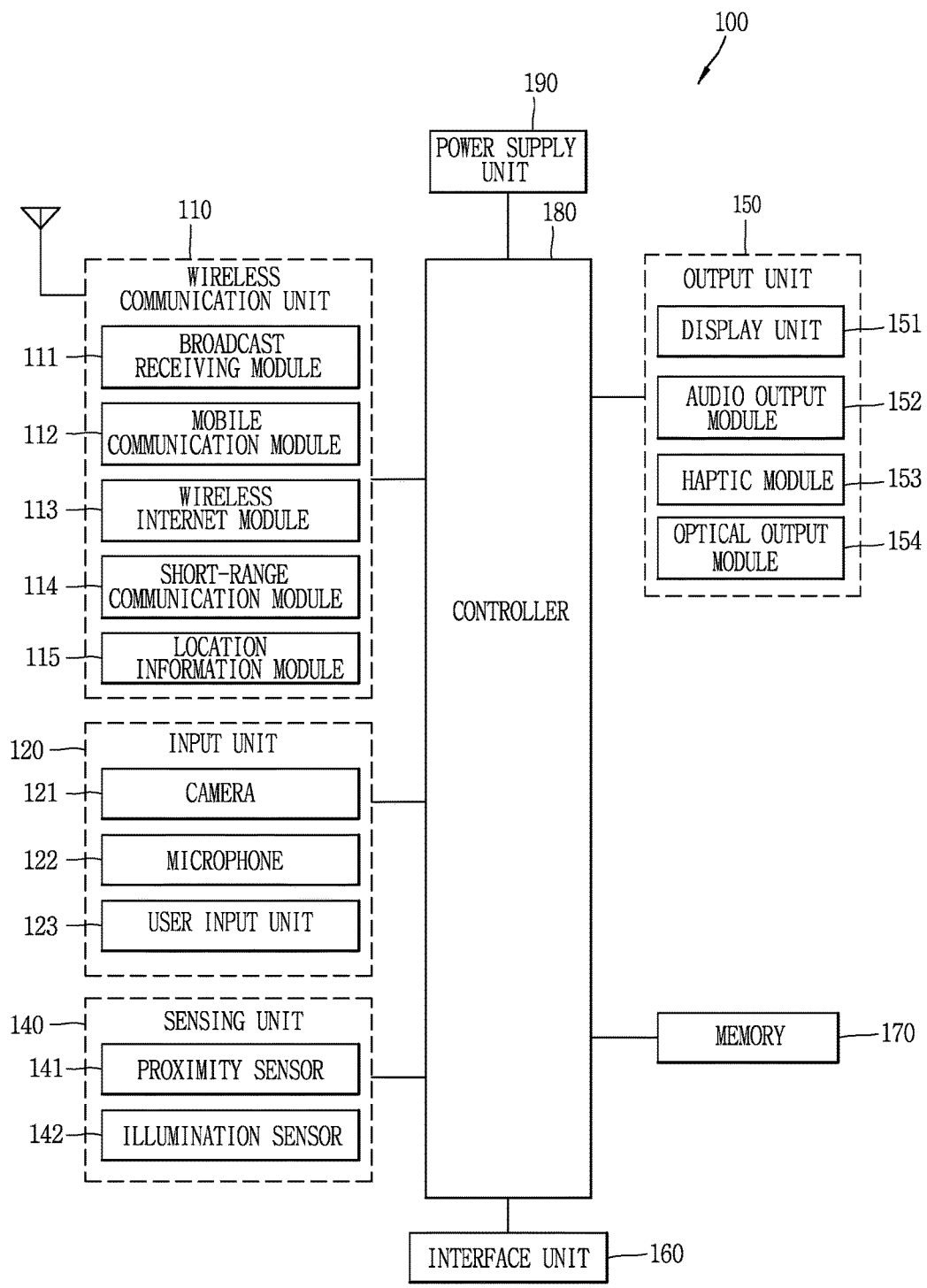
FIG. 1A is a block diagram of a mobile terminal in accordance with one exemplary embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
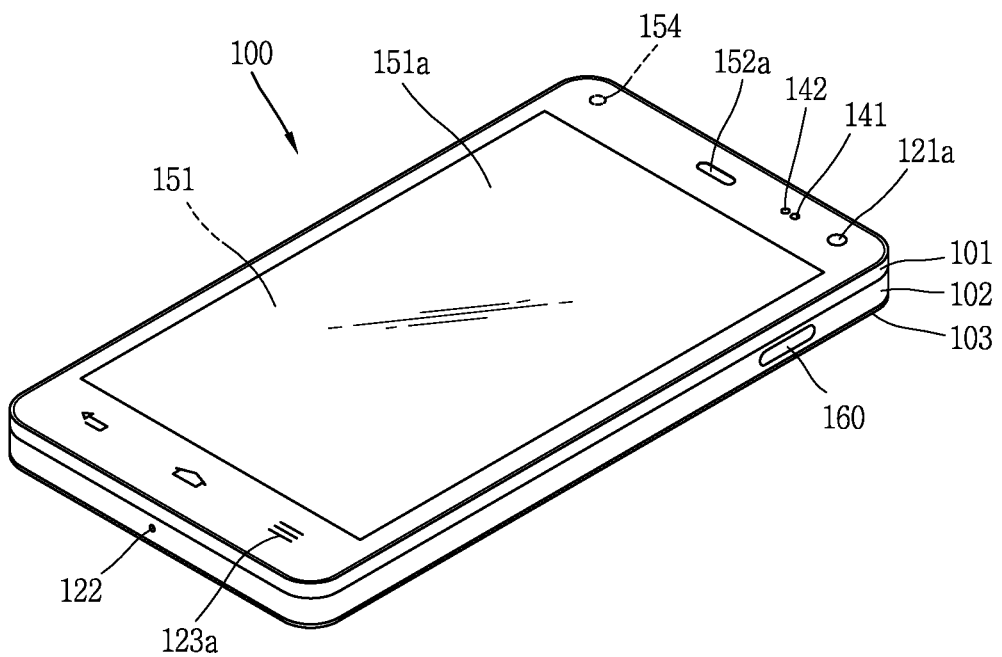
FIGS. 1B and 1C are conceptual views illustrating one example of a mobile terminal, viewed from different directions.
Figure 1C:
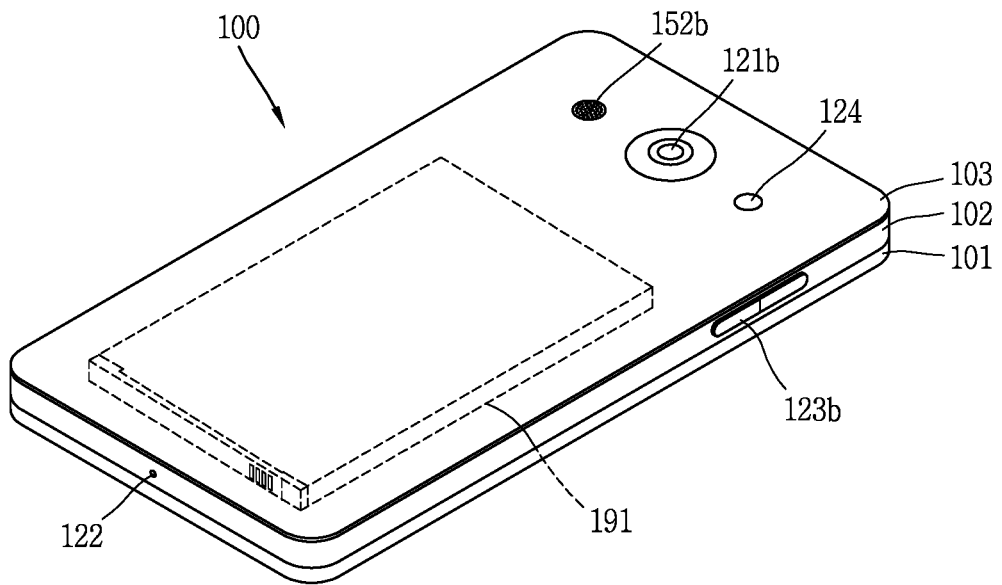

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audinput device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audoutput module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audinput/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audcall signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, RadFrequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input.

Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audinput to the mobile terminal 100. The audinput can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenarin which a pointer is positioned to be proximate to the touch screen without contacting the touch screen. The term "contact touch" will often be referred to herein to denote the scenarin which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audoutput module 152 is generally configured to output auddata. Such auddata may be obtained from any of a number of different sources, such that the auddata may be received from the wireless communication unit 110 or may have been stored in the memory 170. The auddata may be output during modes such as a signal reception mode, a call mode, a record mode, a voice recognition mode, a broadcast reception mode, and the like. The audoutput module 152 can provide audible output related to a particular function (e.g., a call signal reception sound, a message reception sound, etc.) performed by the mobile terminal 100. The audoutput module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audinput/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audwhich are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, a control method to be implemented in the mobile terminal having such configuration and related embodiments will be described with reference to the accompanying drawings. It will be obvious to those skilled in the art that the present disclosure can be specified into other particular forms without departing from the spirit and essential characteristics of the present disclosure.

In the following description, drawings will be explained in a clockwise direction or an up-and-down direction on the basis of a left top drawing.

Hereinafter, a method of providing information related to an image printed out through a photo printer will be described with reference to the accompanying drawings.

Figure 3A:
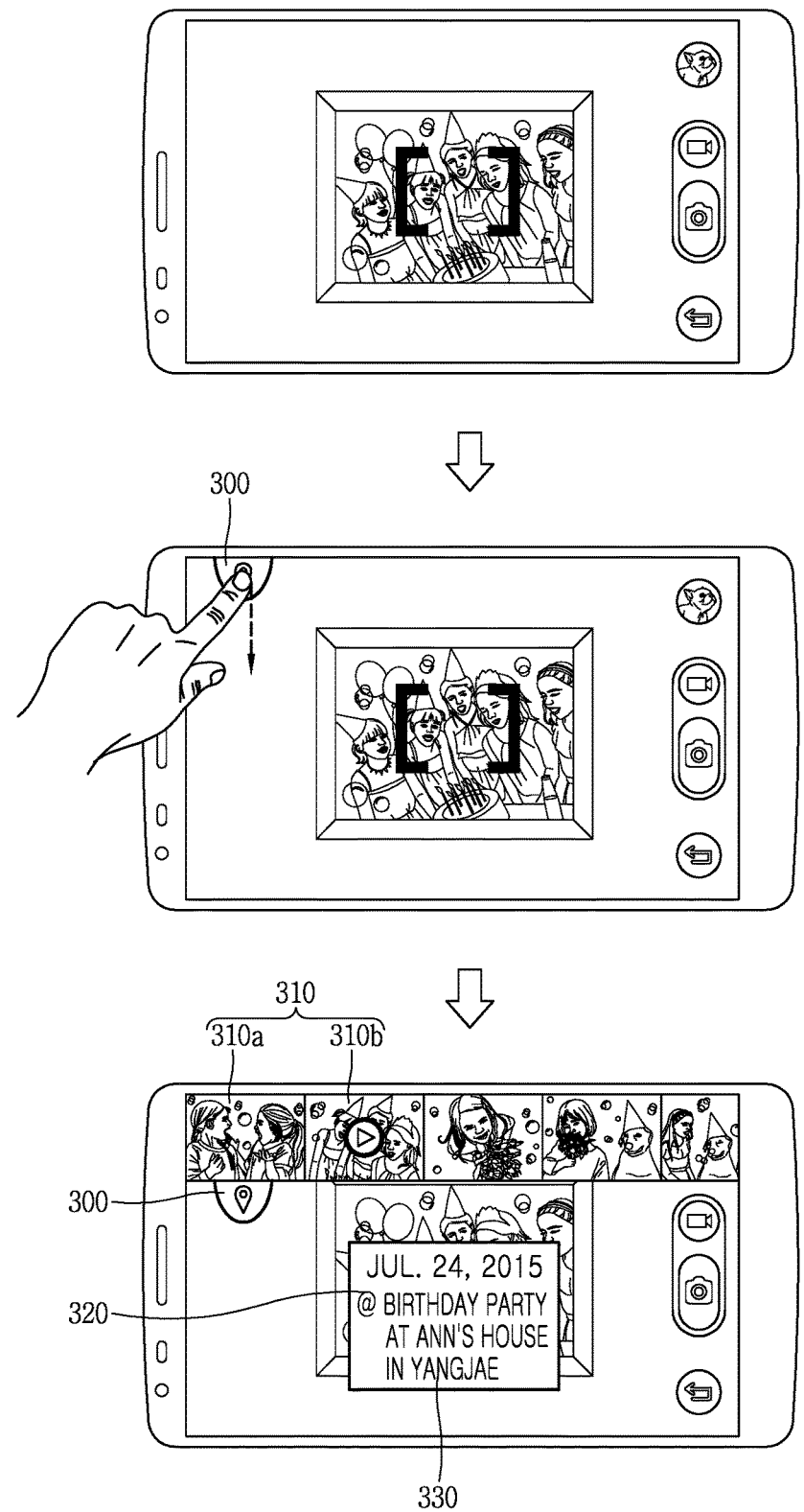
FIGS. 3A and 3B are conceptual views illustrating the control method of FIG. 2.
Figure 3B:
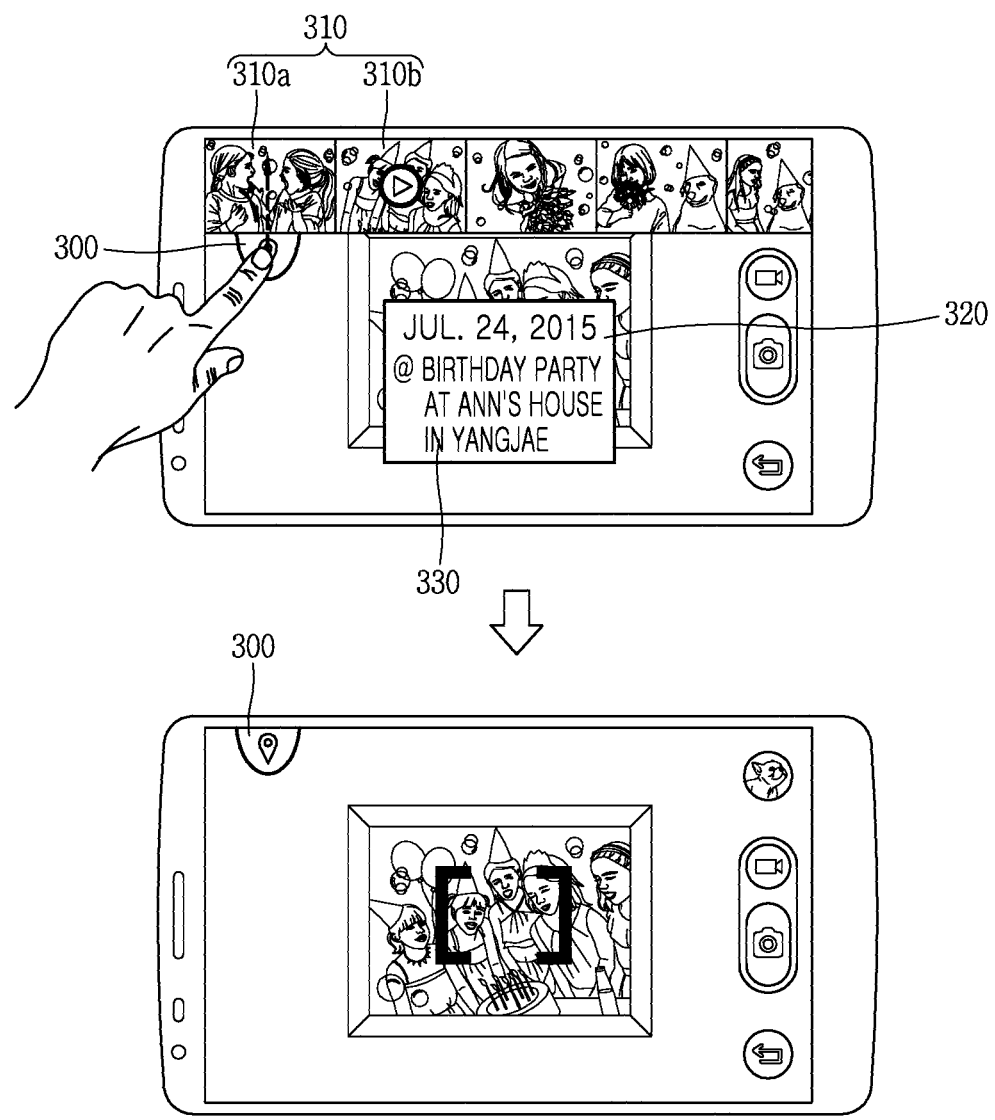

FIG. 2 is a flowchart illustrating a method of providing information related to an image printed out through a photo printer in a mobile terminal in accordance with the present invention, and FIGS. 3A and 3B are conceptual views illustrating the control method of FIG. 2.

The controller 180 of the mobile terminal according to the present invention may receive an image of a subject (or an object to be captured) through a camera 121 (S210).

When the image is received through the camera 121, the controller 180 may output a preview image of the received image on the display unit 151 based on image data corresponding to the image received through the camera 121. The preview image may refer to an image which is previewed before capturing an image.

While the preview image is output on the display unit 151, the controller 180 of the mobile terminal may detect whether or not an image object included in the preview image corresponds to a specific image stored in a memory (S220).

Upon the reception of the image data of the preview image corresponding to the image received through the camera 121, the controller 180 may analyze the preview image. To this end, the controller 180 may detect the image object included in the preview image.

The image object included in the preview image may be an image object corresponding to a product (or a resultant) that the specific image stored in the memory 170 of the mobile terminal is printed out on a printing paper (or a photographic paper) (e.g., a photo printed out on a printing paper) through an external device. For example, the image object included in the preview image may be an image object indicating a photo printed out through a photo printer device, which has received an image signal corresponding to the specific image from the mobile terminal through wireless communication.

The photo printer device may be a printer device that receives the image signal corresponding to the specific image stored in the mobile terminal through communication with the mobile terminal, and prints out the image corresponding to the image signal on a printing paper. The photo printer device may print out the image together with information related to the image when printing out the image on the printing paper. For example, the photo printer device may print out a printed time of the image, a printed date of the image, an identification number thereof, quick response (QR) code information and the like, along with the image. As another example, the photo printer device may receive metadata information relating to the image, as well as the image signal corresponding to the image, from the mobile terminal, and print out the metadata information on an opposite surface to a surface of the printing paper, on which the image is printed out (e.g., a rear surface of the printing paper). The metadata information may be information related to the image, such as a captured location, a captured date, a printed date, a printed time, an image type, an image size, resolution, a focal distance, a white balance, a saving path and the like.

Afterwards, the controller 180 may determine whether or not the detected image object corresponds to the specific image stored in the memory 170 of the mobile terminal.

In more detail, the controller 180 may detect identification information relating to the specific image from the detected image object, or detect the same or similar specific image based on an analysis result of the detected image. The identification information as information for identifying the specific image may be a QR code, an identification number of the photo printer, and the like.

For example, as illustrated in FIG. 3A, the controller 180 may detect an image object corresponding to a printed photo from a preview image, and analyze the image object corresponding to the printed photo. Afterwards, the controller 180 may detect the same or similar image to the printed photo, from a plurality of images stored in the memory 170, on the basis of the analysis information obtained by analyzing the image object corresponding to the printed photo. For example, the controller 180 may detect an image, which is determined to be similar to the printed photo by 80% or more, among those images stored in the memory 170.

As another example, the controller 180 may detect a QR code from a preview image, and detect a specific image having the same identification information as the QR code among a plurality of images stored in the memory 170 on the basis of the detected QR code.

When the image object included in the preview image corresponds to the specific image stored in the memory 170, the controller 180 of the mobile terminal according to the present invention may output an indicator on the display unit 151 to indicate that the image object corresponds to the specific image (S230).

For example, as illustrated in a second drawing of FIG. 3A, when the image object corresponding to the printed photo on the preview image corresponds to the specific image, the controller 180 may output an indicator 300 on the display unit 151 to indicate that the image object corresponds to the specific image. Therefore, a user can recognize that the image object included in the preview image, currently output on the display unit 151, corresponds to the specific image.

Meanwhile, when the image object included in the preview image does not correspond to the specific image stored in the memory 170, the controller 180 may not output the indicator on the display unit 151.

After the output of the indicator on the display unit 151, the controller 180 of the mobile terminal may output information related to the specific image on the display unit 151, in response to a preset type touch (or a preset touch) being applied to the indicator (S240).

The controller 180 may sense a preset touch applied to the indicator while the indicator is output on the display unit 151. The preset touch may be one of a short touch, a long touch, a drag touch and a double touch. For example, as illustrated in the second drawing of FIG. 3A, the controller 180 may sense a drag touch applied to the indicator 300 from up to down.

The controller 180 may output information 310 related to the specific image on the display unit 151, in response to the preset touch applied to the indicator 300.

Also, the information 310 related to the specific image may include at least one of captured place information, captured time information, photo memo information and related image information.

The image information (or image) associated with the specific image may be detected based on the metadata of the specific image. For example, the image associated with the specific image may be at least one image including captured time information and captured place information, which are the same as those related to the specific image, among a plurality of images stored in the memory. In another example, the image associated with the specific image may be an image including at least one of a printed date and a printed time by the photo printer, which are the same or similar to those related to the specific image.

The controller 180 may output the information related to the specific image on at least part of the preview image in an overlapping manner, in response to a touch applied to the indicator. For example, as illustrated in a third drawing of FIG. 3A, the controller 180 may output at least one of the image information 310, captured place information 330 and captured date information 320, related to the specific image, on at least part of the preview image.

Therefore, when a preview image received through a camera includes an image object corresponding to a product printed out through a photo printer, a user may recognize information related to a specific image corresponding to the image object. The user can also be provided with an image captured at a similar place, an image captured at the same date and an image printed out through a photo printer, in association with the specific image. This may refresh the user's memory of the day that the specific image is captured.

Also, when the information related to the specific image is output, the controller 180 may limit a function of capturing an image corresponding to the preview image. More specifically, while the information related to the specific image is output, even though a capture request signal for the image corresponding to the preview image is received, the controller 180 may control the camera 121 not to capture the image. That is, when additional information related to the specific image is provided, the present invention can allow the user to control only the additional information related to the specific image by limiting the capturing function of the camera.

Meanwhile, the controller 180 may control the information related to the specific image to disappear from the display unit 151, in response to a preset touch applied to the indicator while the information related to the specific image is output.

For example, as illustrated in first and second drawings of FIG. 3B, while the information related to the specific image is output, when a drag touch is applied to the indicator 300 in an upward direction, the controller 180 may control those information 310, 320 and 330 related to the specific image to disappear from the display unit 151.

In this instance, the controller 180 may release the limitation on the function of capturing the image received through the camera 121. That is, the present invention can provide the image capturing function of the camera when the information related to the specific image is not output on the display unit 151.

Although not illustrated, the controller 180 may sense that an image object included in a preview image received through the camera 121 changes. In this instance, the controller 180 may redetect another specific image corresponding to the image object included in the changed preview image.

When the another specific image is redetected, the controller 180 may output an indicator indicating that the image object corresponds to the redetected specific image. This may result in providing different information according to a changed preview image when the preview image changes.

Although not illustrated, the controller 180 may also control the indicator to disappear from the display unit 151 based on a control command applied to a user input unit. For example, the controller 180 may control the indicator to disappear from the preview image, in response to a touch applied to the user input unit (e.g., a touch key 123*a* of FIG. 1B) for a preset time. Accordingly, the user can be provided with a clean preview screen without the indicator. That is, the controller 180 may control the indicator to disappear from the display unit or reappear on the display unit by toggling a touch on the same user input unit.

The foregoing description has been given of a method of providing information related to a product printed out through a photo printer when a preview image received through a camera includes an image object corresponding to the product printed out through the photo printer.

Figure 4A:
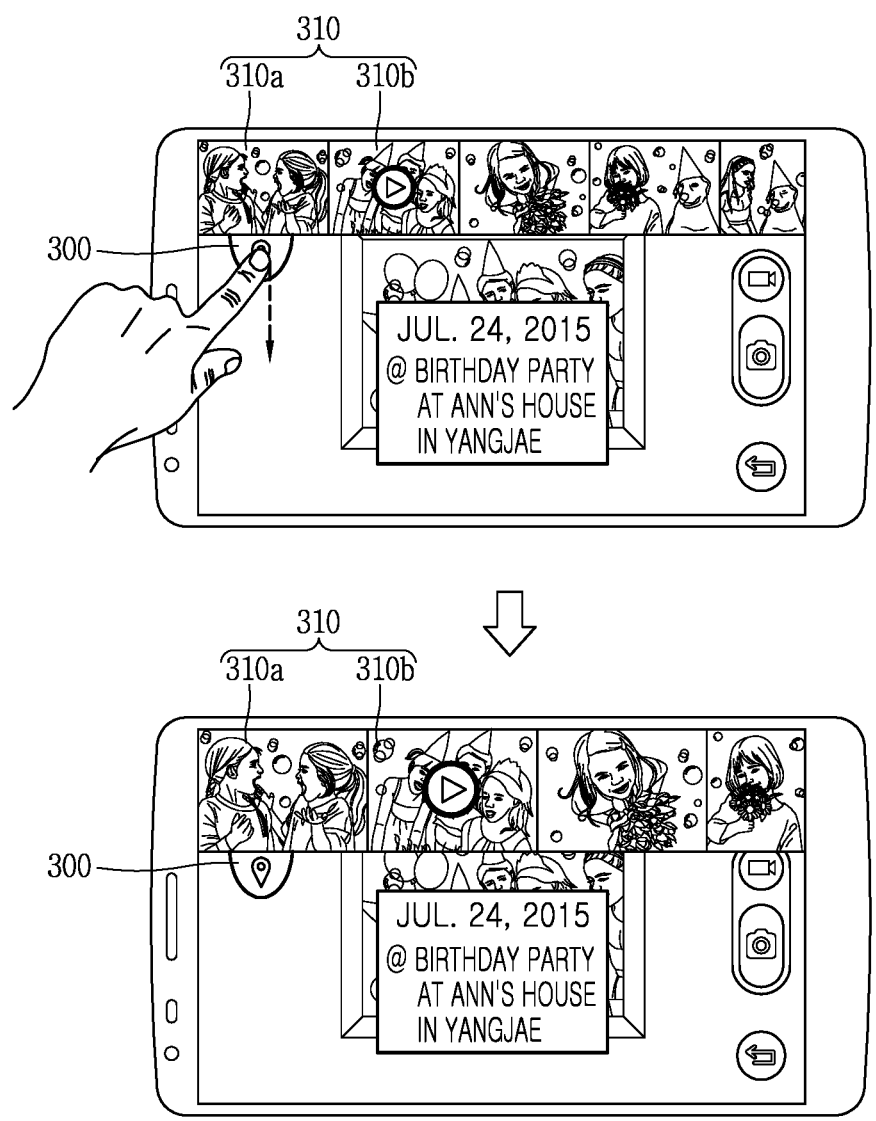
FIGS. 4A to 4C are conceptual views illustrating a method of changing an output shape of information related to a specific image using an indicator.
Figure 4B:
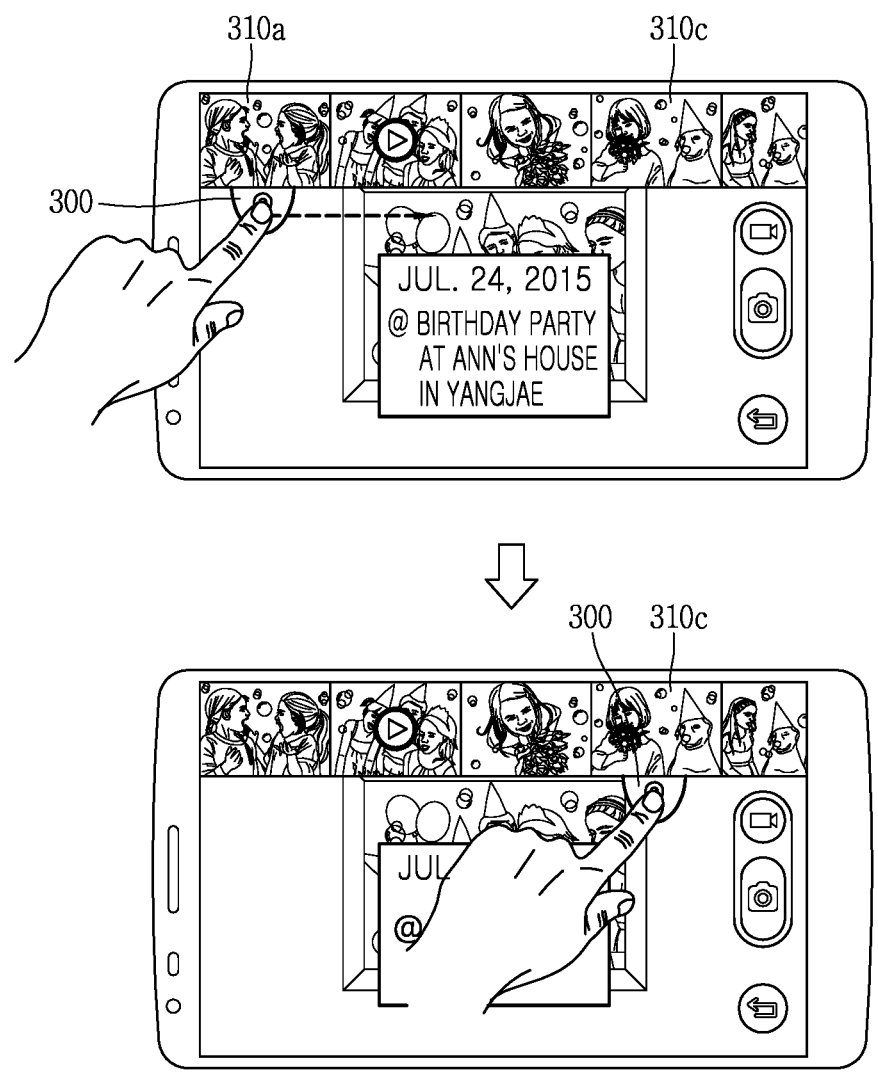
Figure 4C:
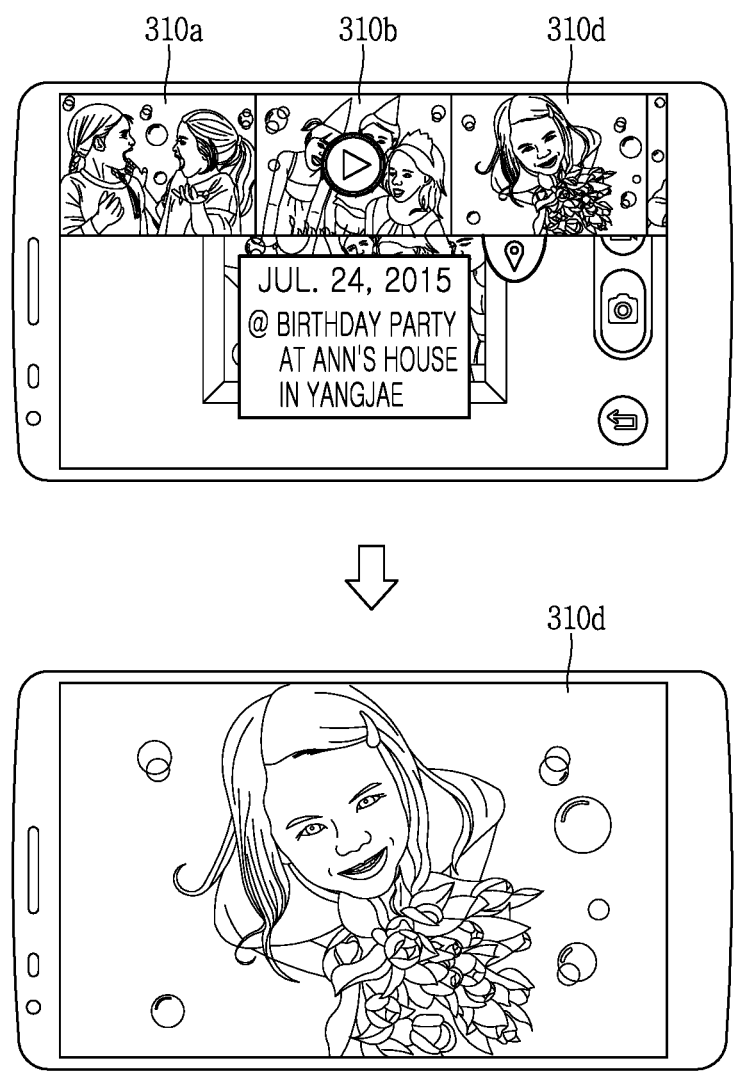

Hereinafter, a method of outputting information related to a specific image will be described. FIGS. 4*a* to 4C are conceptual views illustrating a method of changing an output shape of information related to a specific image using an indicator.

When an image object corresponding to a specific image is detected from a preview image received through a camera, the controller 180 of the mobile terminal according to the present invention may output a graphic object on the display unit 151 to indicate that the image object corresponds to the specific image.

The controller 180 may decide an output shape of information related to the specific image, in response to a preset touch applied to the indicator. The output shape may refer to visual appearance of the graphic object, output on the display unit 151, such as a size, a position, resolution, a color and the like.

For example, as illustrated in a first drawing of FIG. 4A, the controller 180 may output information related to the specific image, in response to a drag touch applied to the indicator 300 from up to down. Here, the controller 180 may output the information related to the specific image in a size corresponding to a touch length of the drag touch. The length of the drag touch may refer to a lineal distance from a start point that the touch is sensed to an end point that the touch is terminated.

Also, a size that matches a touch length of each drag touch may be stored in the memory 170 of the mobile terminal. For example, a first size may match a first touch length and a second size may match a second touch length in the memory 170.

For example, as illustrated in a second drawing of FIG. 4A, the controller 180 may output the information 310 related to the specific image in the first size corresponding to the first touch length, in response to a drag touch applied by the first length.

Also, on the display unit 151 may be output both of the preview image received through the camera 121 and the information related to the specific image. For example, as illustrated in the second drawing of FIG. 4A, the information related to the specific image may also be output on at least part of the preview image on the display unit 151.

When the information related to the specific image is information related to a plurality of images (i.e., a plurality of image information), the controller 180 may output only at least some of the plurality of images and control the other to disappear from the display unit 151, in response to the plurality of images being output with their sizes gradually increasing. For example, as illustrated in the second drawing of FIG. 4A, while five images are output, when a drag input is applied in an upward direction, the controller 180 may control only four images to be displayed in a size corresponding to a length of the drag touch and the rest one image to disappear from the display unit 151.

The controller 180 may also select specific information from the information related to the specific image, in response to a drag touch applied to the indicator 300 in a left-and-right direction. For example, as illustrated in a first drawing of FIG. 4B, when the drag touch is applied to the indicator 300 in the left-and-right direction, the controller 180 may move the indicator 300 to an area, which is adjacent to an output area of one of the plurality of images, among the plurality of images related to the specific image.

Afterwards, when the drag touch applied in the left-and-right direction is removed after the indicator 300 is moved, the controller 180 may select the one image displayed on the area adjacent to the output area, on which the moved indicator is output. For example, as illustrated in a second drawing of FIG. 4B, in a state that a first image 310a has been selected before the indicator 300 is moved, when the indicator 300 is moved in response to a drag touch applied thereto in a left-and-right direction, the controller 180 may select a second image 310c displayed on an area adjacent to an area to which the indicator 300 has been moved.

Also, the controller 180 may output the information related to the specific image on an entire output area of the display unit 151, in response to a user request. In this instance, the controller 180 may control the preview image of the image received through the camera to disappear from the display unit 151.

For example, as illustrated in a first drawing of FIG. 4C, after selecting one image 310d from the plurality of images associated with the specific image using the indicator 300, when a drag touch is applied to the indicator 300 in an up-and-down direction, the controller 180 may output the one image 310d in a size corresponding to a length of the drag touch.

In addition, after the one image 310d is selected, when a drag touch applied by a preset reference length or more is sensed, the controller 180 may output the one image 310d in a size corresponding to the full output area of the display unit 151. In this instance, the preview image received through the camera 121 may not be output on the display unit 151 any more. Therefore, the user can be provided on a larger screen with the one image 310d selected by the user from the plurality of images associated with the specific image.

Although not illustrated, when the one image 310d selected is a video (or a moving image), the controller 180 may immediately reproduce the video while outputting the video in a size corresponding to the entire output size of the display unit 151.

The foregoing description has been given of the method of providing the information related to the specific image when the image received through the camera corresponds to the specific image. Accordingly, when capturing an external object, as a subject to be captured, corresponding to the specific image through the camera, the present invention can provide the captured image along with the information related to the specific image.

Hereinafter, description will be given of a method of providing the information related to the specific image. FIGS. 5A to 5D are conceptual views illustrating a method of providing information related to a specific image.

When an image corresponding to a specific image is received through the camera 121, the controller 180 according to the present invention may provide information related to the specific image on a preview image of the received image.

The controller 180 may output the information related to the specific image on the entire output area of the display unit 151, in response to a user request. For example, as illustrated in FIG. 4C, the controller 180 may output one of a plurality of images associated with the specific image on the entire output area of the display unit 151, in response to a preset touch applied to the one image information.

When a preset touch is applied while the one of the plurality of images associated with the specific image is output on the entire output area of the display unit 151, the controller 180 may output another image (information), different from the one image information, on the display unit 151. Here, the image information different from the one image information may be information related to the specific image.

Figure 5A:
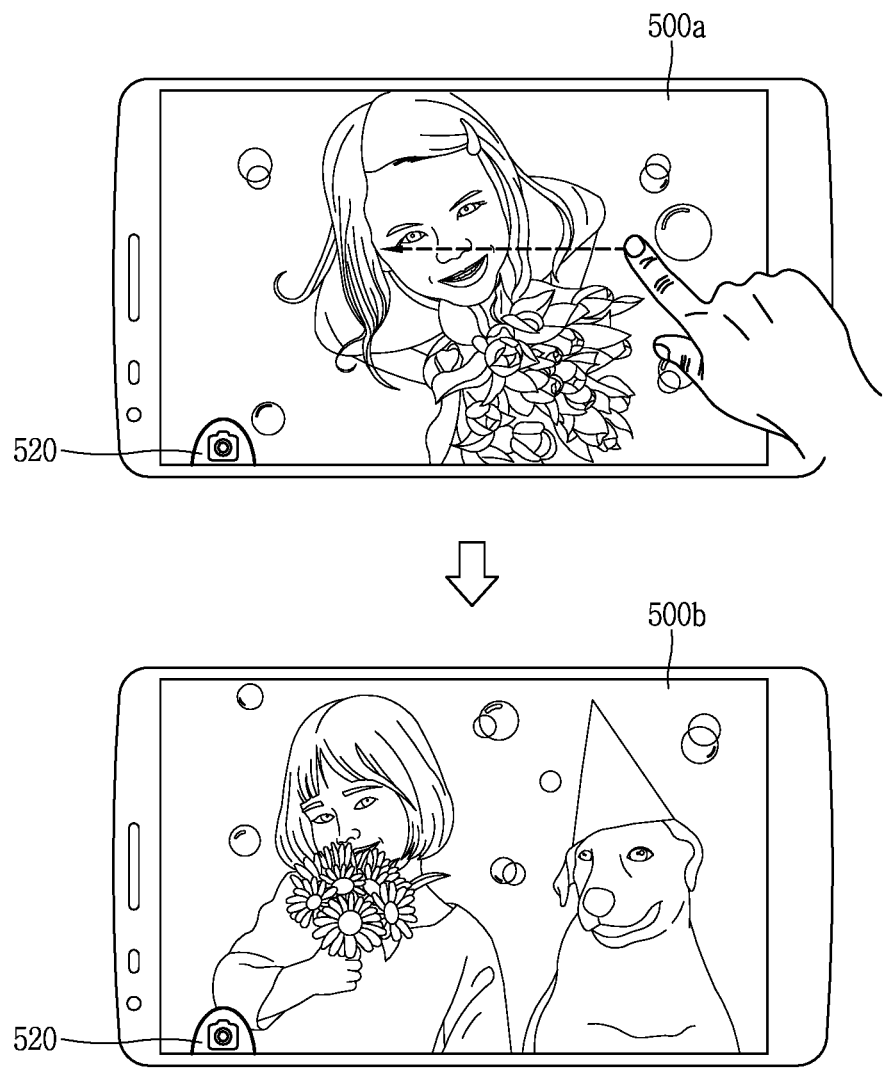
FIGS. 5A to 5D are conceptual views illustrating a method of providing information related to a specific image.

For example, as illustrated in first and second drawings of FIG. 5A, when a flicking touch is applied while one image information 500a of a plurality of images associated with the specific image is output, the controller 180 may output another image information 500b, different from the one image information 500a, among the plurality of images, on the display unit 151. Here, the another image information 500b may be another image information related to the specific image. That is, the present invention can facilitate for an access to different image information related to the specific image in response to the flicking touch upon displaying the plurality of image information related to the specific image.

Here, when one of the plurality of image information related to the specific image is output on the entire output area of the display unit 151, the controller 180 may further output a graphic object, which indicates that the one image is associated with the specific image, on one area of the one image information. For example, as illustrated in the first drawing of FIG. 5A, the controller 180 may further output a graphic object 520 on the one image information 500*a* to indicate that the one image information 500*a* is associated with the specific image.

The controller 180 may perform a different function, in response to a preset touch applied to the graphic object 520 indicating the image information related to the specific image.

The different function may be one of a function of outputting an image list having items corresponding to the plurality of images associated with the specific image, and a function of entering a preview image.

Figure 5B:
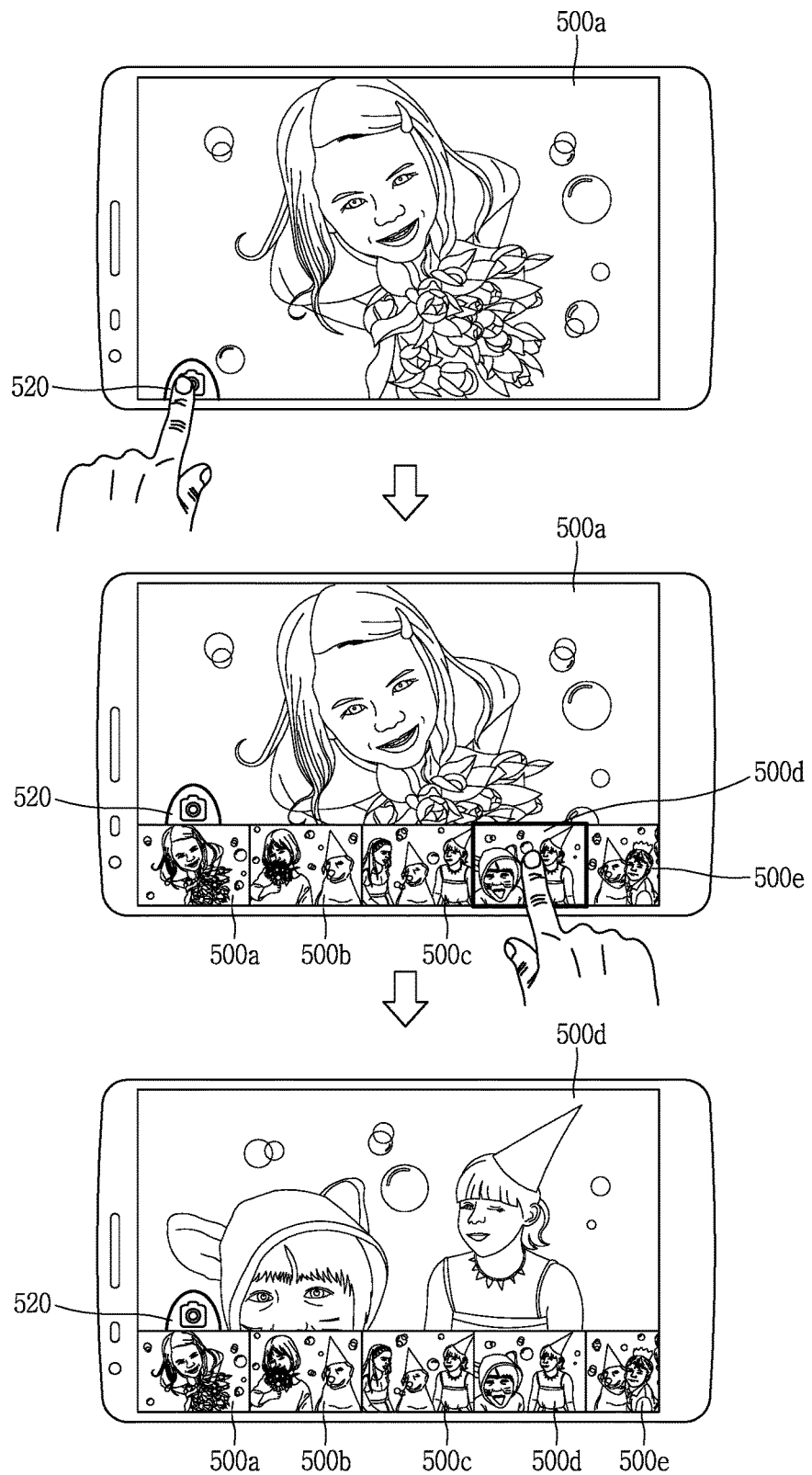

For example, as illustrated in a first drawing of FIG. 5B, the controller 180 may sense a short touch applied to the graphic object 520 which indicates the image associated with the specific image. In this instance, as illustrated in a second drawing of FIG. 5B, the controller 180 may output an image list having items corresponding to a plurality of images 500*a* to 500*e* associated with the specific image on one area of the display unit 151, in response to the short touch. As illustrated in a third drawing of FIG. 5B, when a touch is applied to an item corresponding to one image 500*d* of the items included in the image list, the controller 180 may output the one image 500*d* on the entire area of the display unit 151. This may facilitate the user to access the information related to the specific image.

Figure 5C:
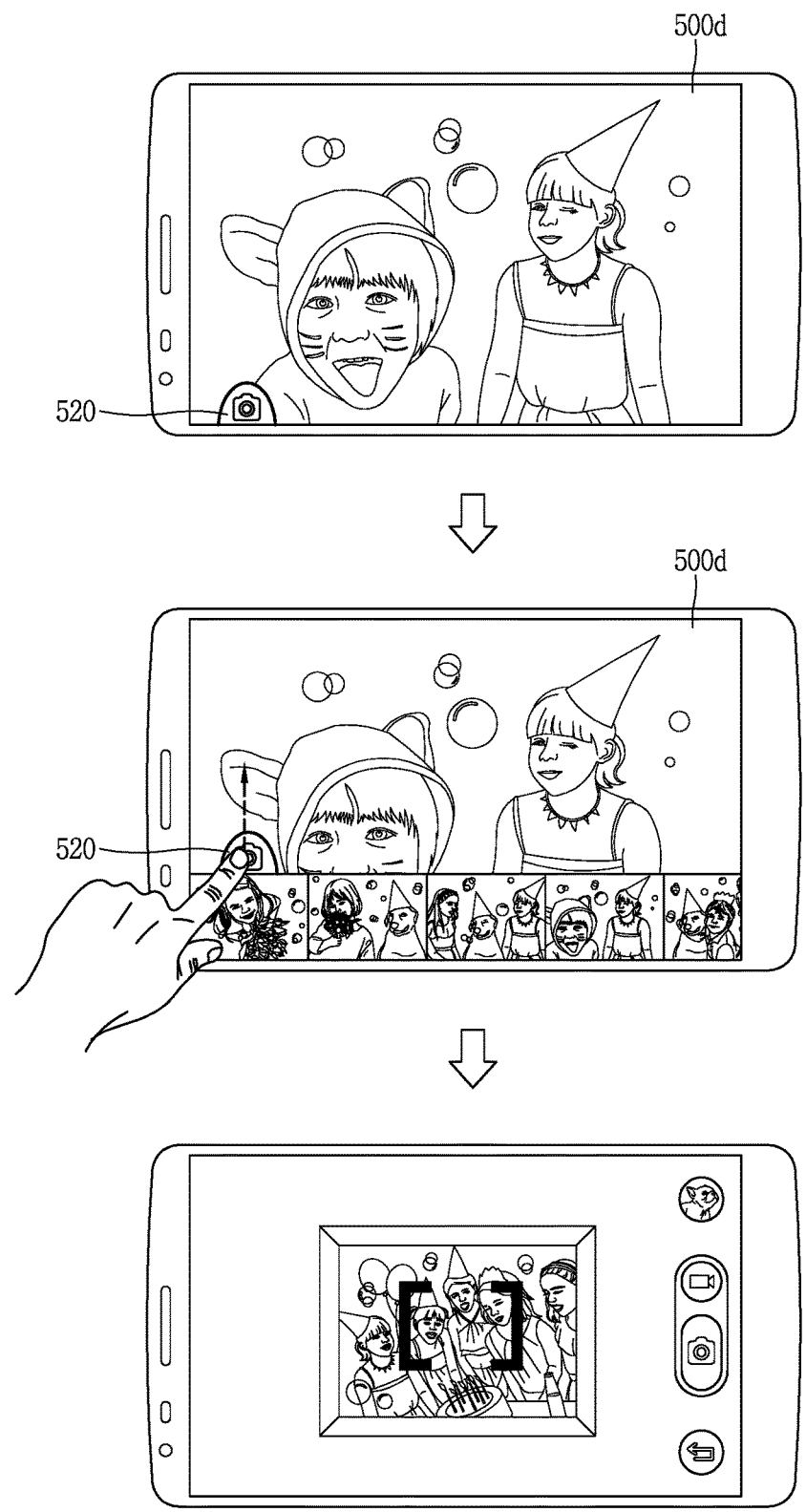
Figure 5D:
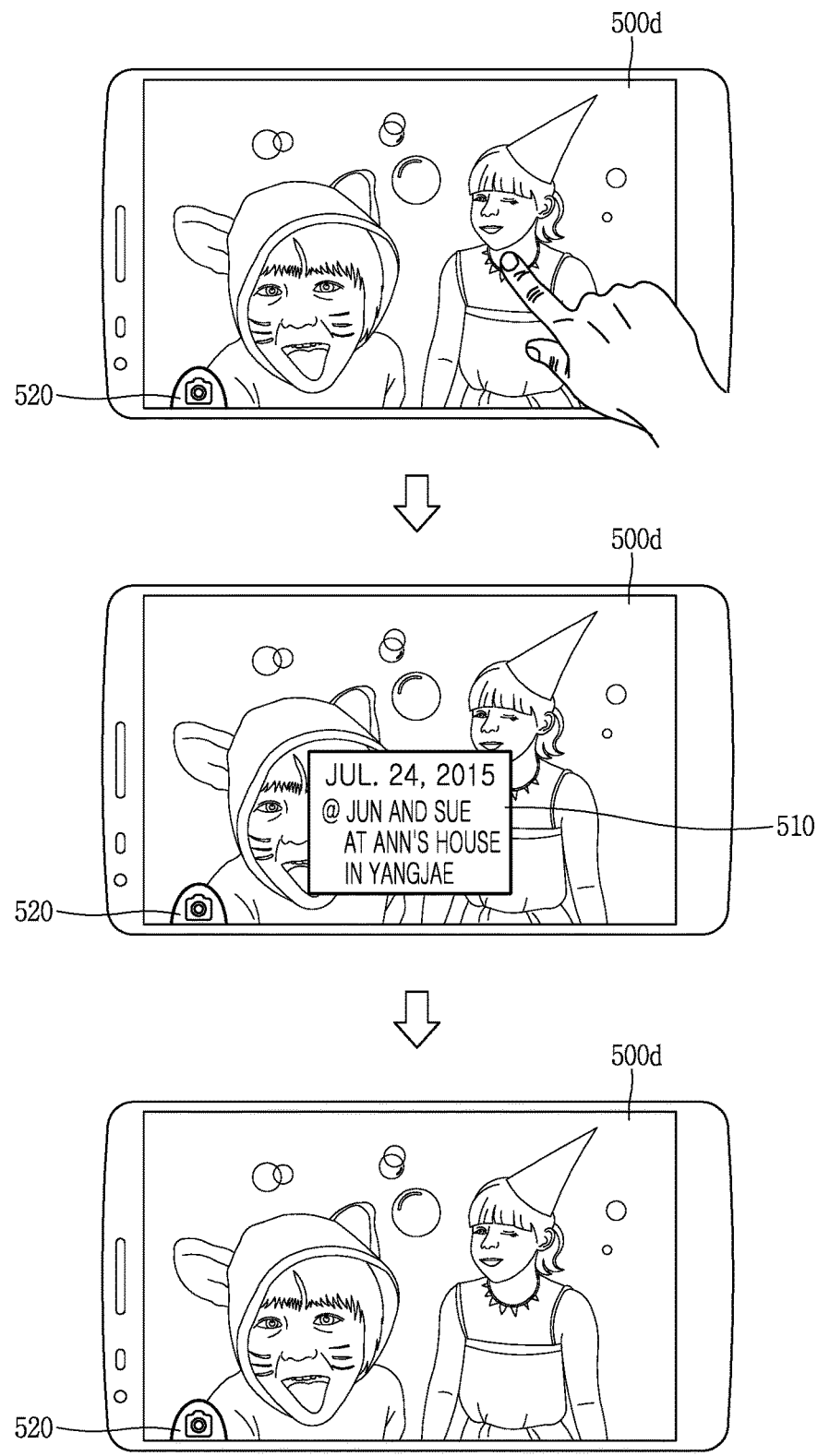
Figure 6B:
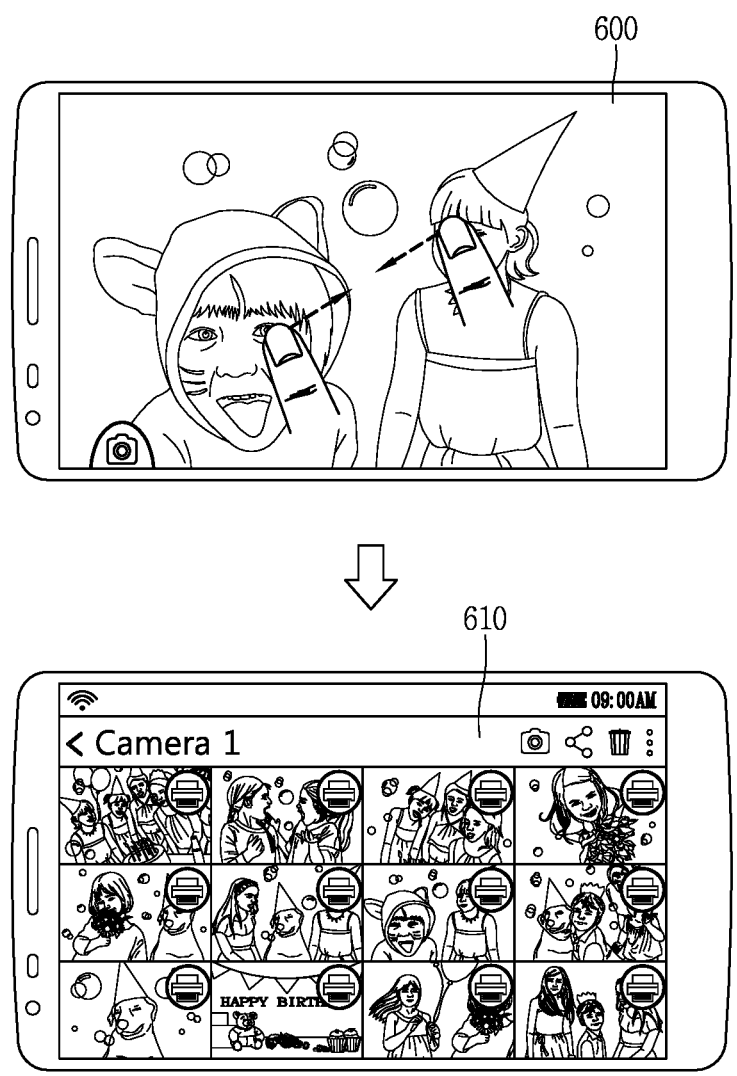

On the other hand, as illustrated in first and second drawings of FIG. 5C, the controller 180 may sense an upward drag touch applied to the graphic object 520 indicating the image associated with the specific image. In this instance, the controller 180 may control the display unit 151 to output the preview image of the image received through the camera 121, in response to the upward drag input. For example, as illustrated in a third drawing of FIG. 5C, the controller 180 may switch the one image 500*d* into the preview image of the image received through camera 121. That is, when an image object corresponding to the specific image is included in the preview image of the image received through the camera 121, the controller 180 may output an image associated with the specific image. Also, the controller 180 may then enter the preview image of the image received through the camera 121 through the information related to the specific image.

The controller 180 may also output detailed information related to one image information related to the specific image, in response to a touch being applied to the one image when the one image is output on the entire output area of the display unit 151. For example, as illustrated in a first drawing of FIG. 5D, the controller 180 may sense a touch applied to the one image 500*d*. In this instance, as illustrated in a second drawing of FIG. 5D, the controller 180 may output detailed information 510 related to the one image 500*d* on the one image 500*d*.

Also, the controller 180 may output the detailed information 510 related to the one image 500*d* for a preset time. For example, as illustrated in second and third drawings of FIG. 5D, when the preset time elapses after the one image 500*d* and the detailed information 510 are output, the controller 180 may control the detailed information to disappear from the display unit 151. Therefore, the user can be temporarily provided with the detailed information.

The foregoing description has been given of the method of providing the information related to the specific image.

Hereinafter, description will be given of a method of executing a different function, in response to a different touch applied to information related to a specific object upon providing the information related to the specific image. FIGS. 6A, 6B, 7A and 7B are conceptual views illustrating a method of executing a different function, in response to a different type of touch applied to information related to a specific image, when the information related to the specific image is provided.

Upon providing information related to a specific image, the controller 180 may execute a different function, in response to a different touch applied to the information related to the specific image. The different touch may be a pinch-in touch, a pinch-out touch, and a drag touch in a predetermined direction.

The different function may be one of a function of outputting a preview image of an image received through a camera, a function of outputting a printed image list including items corresponding to printed images through a photo printer, and a function of using information related to a specific image.

First, the controller 180 may execute the function of outputting the preview image of the image received from the camera 121 on the display unit 151, in response to a first touch applied to one image (or one image information) 600. For example, as illustrated in first and second drawings of FIG. 6A, the controller 180 may output the preview image on the display unit 151, in response to a pinch-out touch applied to the one image 600 while the one image 600 is output as the information related to the specific image.

The controller 180 may also output a printed image list including items corresponding to images printed out through a photo printer on the display unit 151, in response to a second touch applied to the one image 600. For example, as illustrated in first and second drawings of FIG. 6B, the controller 180 may output on the display unit 151 a printed image list 610 including items corresponding to images printed out through a photo printer, in response to a pinch-in touch applied to the one image information 600. That is, according to the present invention, when an image object corresponding to a photo printed out through the photo printer is included in the preview image, information related to the printed photo may be displayed. In addition, the present invention can provide a combination or collection of photos printed out through the photo printer.

In addition, when the printed image list 610 including the items corresponding to the images printed out through the photo printer is output, the controller 180 may further output a graphic object, which indicates the photo printer, on one area of a thumbnail image indicating each printed image. Therefore, the user can recognize that the images included in the printed image list 610 are images with histories that they have been printed out through the photo printer.

Also, the controller 180 may output a function list 620 corresponding to functions using the one image 600, in response to a third touch applied to the one image 600.

Figure 7A:
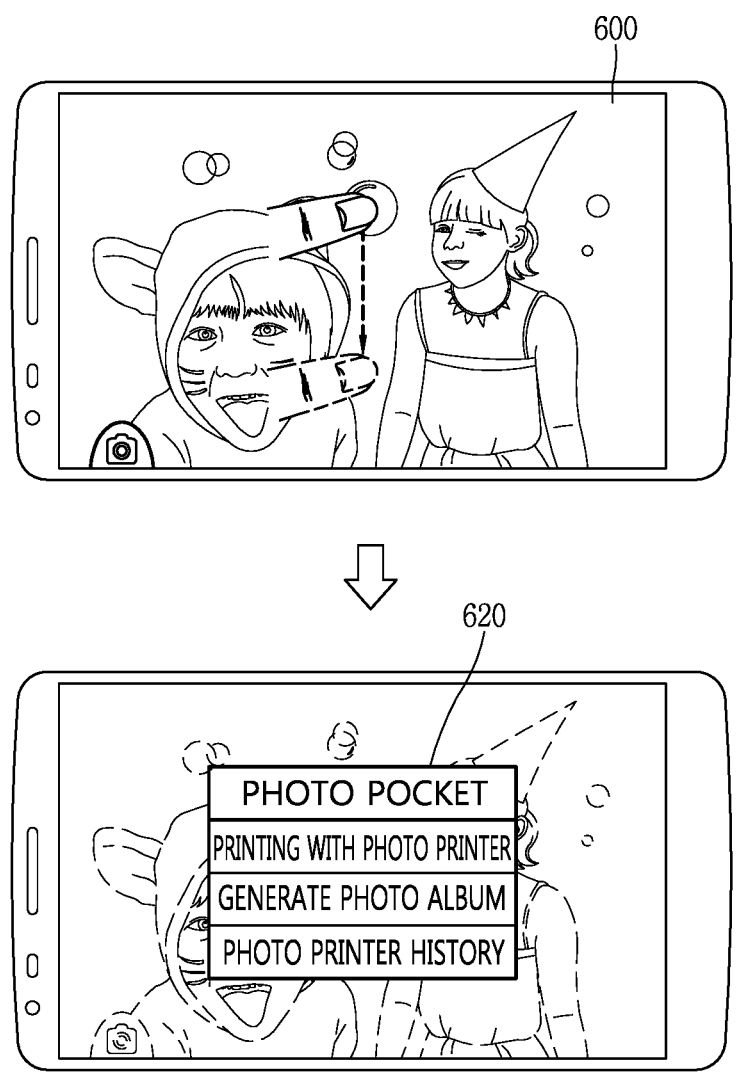

For example, as illustrated in a first drawing of FIG. 7A, the controller 180 may output a function list 620, in response to a downward drag touch applied to the one image 600.

The function list 620 may include items indicating a printing function using the photo printer, a function of generating a photo album (or electronic paper), photo printer history information function and the like.

The printing function using the photo printer is a function of printing the one image 600 on a printing paper through wireless communication with the photo printer as an external device. The function of generating the photo album may be a function of storing images printed out through the photo printer into one album in an associating manner, based on history information related to the images printed out through the photo printer, and providing the images in the form of the album. The photo printer history information function may be a function of providing information printed out along with an image, such as a printed time, a printed date and identification information related to a used photo printer.

In this instance, the user may execute those functions included in the function list 620 using the function list 620. For example, when the user selects the printing function using the photo printer, the controller 180 may transmit an image signal corresponding to one image 600 to the photo printer in order to print the one image 600.

The controller 180 may also output guide information 630 for outputting the preview image of the image received through the camera 121, in response to a fourth touch applied to the one image 600. For example, as illustrated in a first drawing of FIG. 7B, the controller 180 may sense an upward drag touch applied to the one image information 600.

In this instance, as illustrated in a second drawing of FIG. 7B, the controller 180 may output guide information 630 for outputting the preview image of the image received from the camera. Therefore, the user may or may not execute the function of outputting the preview image based on the guide information 630.

The foregoing description has been given of a method of executing a different function based on a different touch applied to information related to a specific image.

Figure 8A:
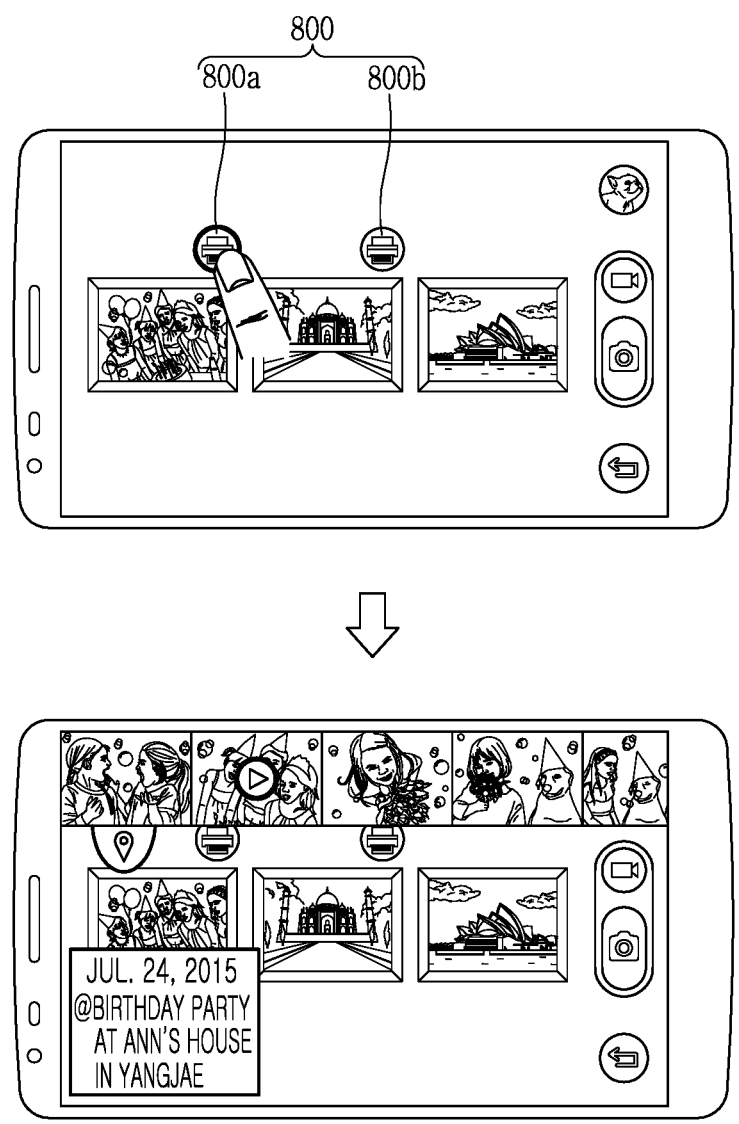
FIGS. 8A and 8B are conceptual views illustrating a method of providing information related to each image when a plurality of objects included in a preview image correspond to different images, respectively.
Figure 8B:
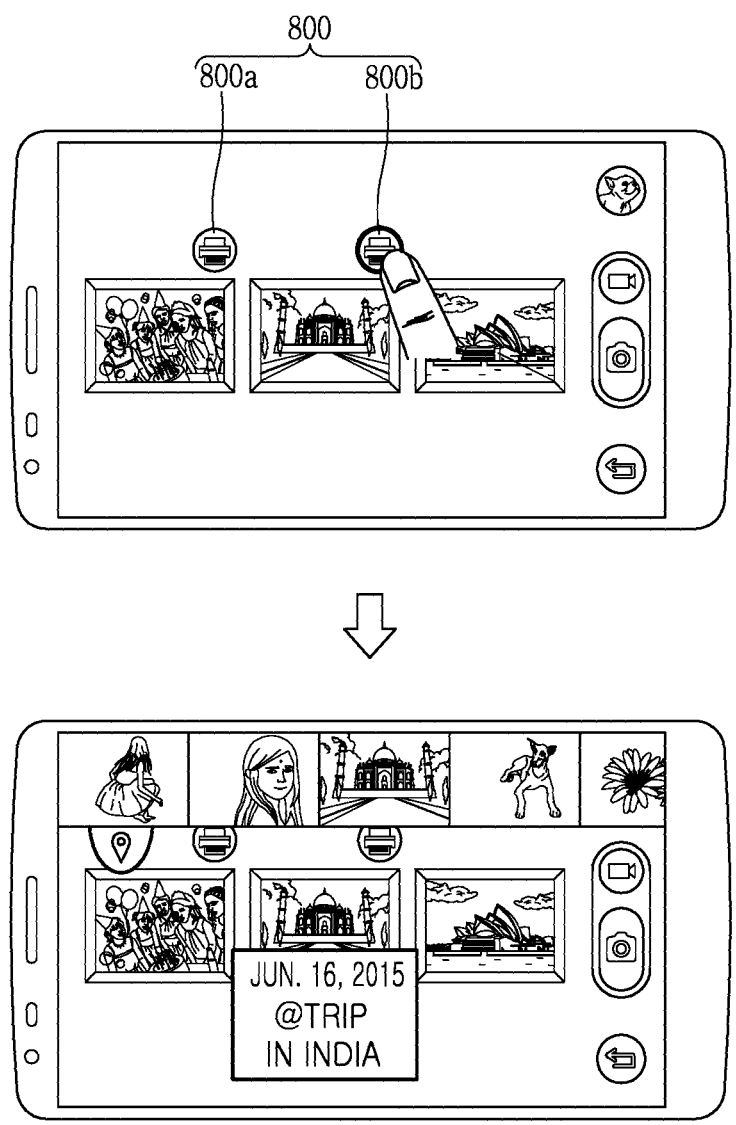

Hereinafter, description will be given of a method of providing image-related information through each of a plurality of image objects included in a preview image, when the plurality of image objects correspond to different images, respectively. FIGS. 8A and 8B are conceptual views illustrating a method of providing information related to each image when a plurality of objects included in a preview image correspond to different images, respectively.

The controller 180 of the mobile terminal may detect a plurality of image objects from a preview image of an image received through the camera 121.

When the plurality of graphic objects are detected, the controller 180 may determine whether or not there are images corresponding to the plurality of image objects, respectively, among images stored in the memory 170.

When an image corresponding to at least one of the plurality of graphic objects is present, the controller 180 may output a graphic object 800 indicating the presence of the corresponding image on an area adjacent to an output area of the graphic object with the corresponding image.

Here, the graphic object with the corresponding image may be an image object with a history that it has been printed out through the photo printer. That is, when an image object corresponding to a product printed out through the photo printer is included in the preview image, the present invention can detect that the image object is an image printed out through the photo printer.

For example, as illustrated in a first drawing of FIG. 8A, while first to third image objects are included in a preview image, the controller 180 may detect images corresponding to the first to third image objects, respectively. In this instance, as illustrated in the first drawing of FIG. 8A, the controller 180 may output graphic objects 800a and 800b indicating presence of the corresponding images near output areas of the first and second image objects, respectively.

However, when an image corresponding to the third image object is not detected, the controller 180 may not output a graphic object indicating the presence of the corresponding image on an area adjacent to the output area of the third image object. Therefore, the user can intuitively recognize whether or not each image object included in the preview image is a printed image by the photo printer.

The controller 180 may also output information related to a corresponding image, in response to a touch applied to the graphic object 800 indicating the presence of the corresponding image among the plurality of image objects included in the preview image. For example, as illustrated in a second drawing of FIG. 8A, the controller 180 may output information related to an image corresponding to the first image object, in response to a touch applied to the graphic object 800a output on an area adjacent to the output area of the first image object. In another example, as illustrated in first and second drawings of FIG. 8B, the controller 180 may output information related to an image corresponding to the second image object, in response to a touch applied to the graphic object 800b output on an area adjacent to the output area of the second image object.

Therefore, the user can be provided with information related to each image when a plurality of image objects have corresponding images, respectively.

Although not illustrated, when images corresponding to a plurality of image objects, respectively, are detected from a preview image, the present invention may equally apply the control method in case where a specific image corresponding to one image object is detected.

The foregoing description has been given of a method of providing related information when a plurality of image objects are detected from a preview image.

Hereinafter, description will be given of a method of providing information related to a printing history by a photo printer through a gallery function. FIGS. 9A to 9D are conceptual views illustrating a method of providing information related to a printing history by a photo printer through a gallery application.

The controller 180 of the mobile terminal according to the present invention may provide history information on a photo printed out through a photo printer through a gallery application installed on the mobile terminal. Here, the gallery application may be an application program of performing a function of outputting on the display unit 151 still images and videos stored in the memory 170.

The controller 180 may execute the gallery application in response to a user request for executing the gallery application. For example, the controller 180 may execute the gallery application in response to a touch applied to an icon associated with the gallery application.

When the gallery application is executed, the controller 180 may output on the display unit 151 a thumbnail image of at least one of a plurality of images stored in the memory 170. For example, as illustrated in a first drawing of FIG. 9A, the controller 180 may output a thumbnail image corresponding to each of the at least one image on the display unit 151 when the gallery application is executed.

Figure 9A:
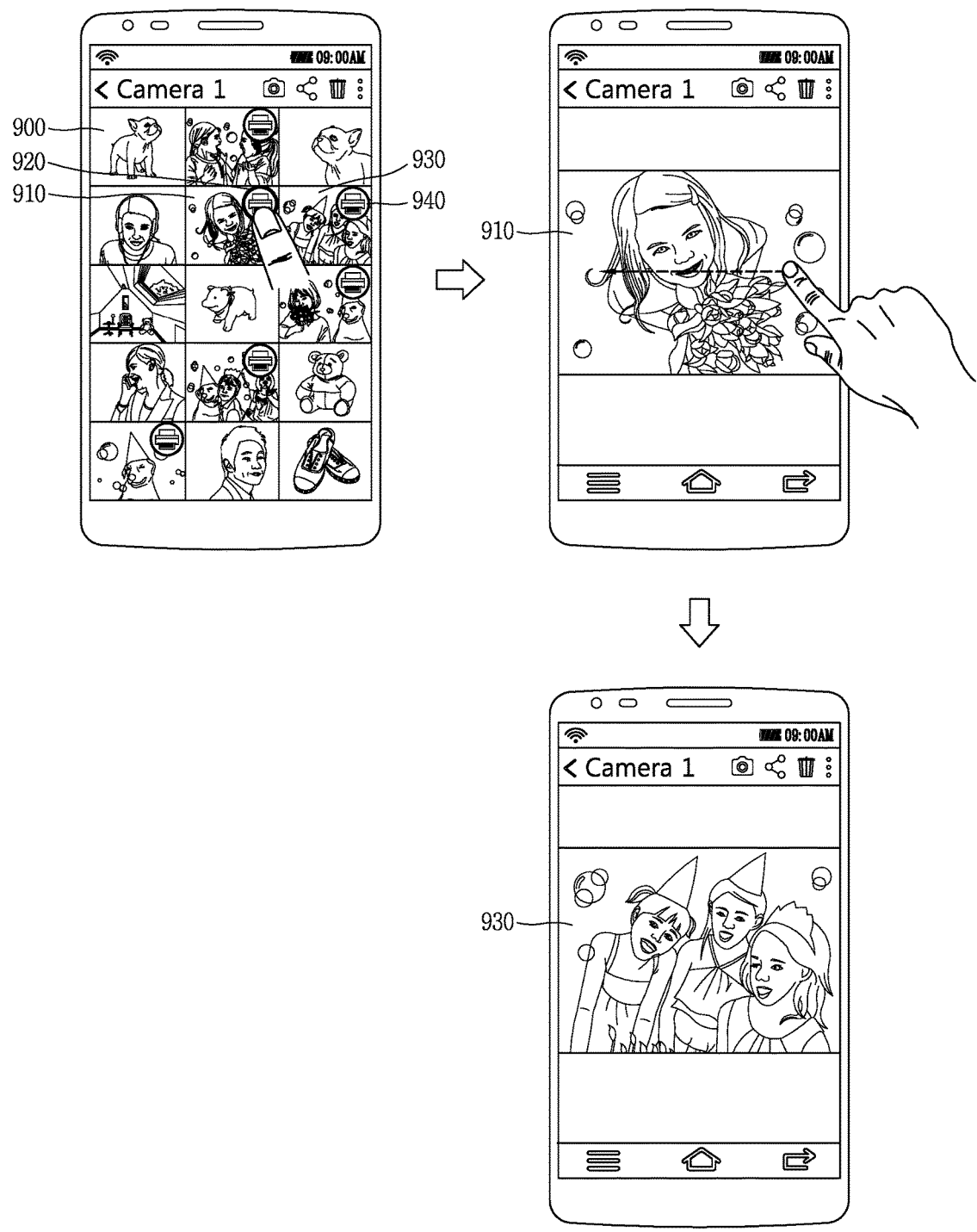
FIGS. 9A to 9D are conceptual views illustrating a method of providing information related to a printing history through a photo printer, by use of a gallery application.

The controller 180 may output a graphic object indicating presence of information related to the printing history through the photo printer, with respect to a thumbnail image of an image with the printing history through the photo printer, on the thumbnail image of the image having the printing history-related information, among thumbnail images of the at least one image. For example, as illustrated in FIG. 9A, the controller 180 may output a graphic object 920 on a thumbnail image 910 of an image having a history that it has been printed out through the photo printer, to indicate the presence of the printing history, among thumbnail images 900 and 910 of the at least one image output on the display unit 151. Therefore, the user can recognize the image printed out through the photo printer, among those images stored in the memory 170, through the gallery application.

Also, the present invention can display an image with printing history information indicating that the image has been printed out through the photo printer, and an image without such printing history information, in a visually distinguishable manner, using graphic objects indicating presence of the printing history information through the photo printer. Here, the image without the printing history information that the image has been printed out through the photo printer may be an image without a printing-related history through the photo printer. Accordingly, the present invention can allow for visual discrimination of an image printed out through the photo printer and an image without being printed out through the photo printer, on the gallery application.

The controller 180 may also execute a function associated with the photo printer through a graphic object 920 indicating the presence of the printing history information through the photo printer. The function associated with the photo printer may be a function of providing an image including printing history information through the photo printer. In this instance, the controller 180 may output only the image including the printing history information regarding the printing through the photo printer on the display unit 151, among a plurality of images stored in the memory 170.

For example, as illustrated in first and second drawings of FIG. 9A, the controller 180 may execute the function of providing the image including the printing history information through the photo printer, in response to a short touch applied to the graphic object 920 indicating the presence of the printing history information through the photo printer.

In this instance, the controller 180 may output, on a full output area of the display unit 151, an image corresponding to the thumbnail image 910, which is displayed on an area adjacent to an output area of the graphic object 920 indicating the presence of the printing history information through the photo printer.

When the function of providing the image including the printing history information through the photo printer, the controller 180 may output on the display unit 151 another image 930 having such printing history information through the photo printer, in response to a flicking touch applied to the image corresponding to the thumbnail image 910. That is, when the function of providing the image including the printing history information through the photo printer, the image without the printing history information through the photo printer may not be output on the display unit 151. Therefore, the user can selectively be provided with the images printed out through the photo printer.

Although not illustrated, when a touch is applied to the thumbnail image 910, other than the graphic object 920 indicating the presence of the printing history information through the photo printer, the controller 180 may not execute the function of providing the image including the printing history information through the photo printer.

Even in this instance, the controller 180 may output the image corresponding to the thumbnail image 910 on the display unit 151. However, the controller 180 may control the display unit 151 to output an image different from the image corresponding to the thumbnail image 910, based on an output order prestored in the memory 170, irrespective of presence or absence of the printing history information through the photo printer, in response to a flicking touch applied to the image corresponding to the thumbnail image 910. Therefore, the user can be provided with both of the printed images and the non-printed images through the photo printer.

The controller 180 may also execute a different function associated with the photo printer, on the basis of a different touch applied to the graphic object 920 indicating the presence of the printing history information through the photo printer. The different touch may be a long touch, a drag touch, a double touch or the like. The function associated with the photo printer may be a function of providing a function list including items corresponding to additional functions associated with the photo printer, or a function of outputting only thumbnail images of images including the printing history information through the photo printer.

In more detail, the controller 180 may output the function list including the items corresponding to the additional functions associated with the photo printer, in response to a first touch applied to the graphic object 920 indicating the presence of the printing history information through the photo printer. The additional functions associated with the photo printer may include an executable function using an image printed out through the photo printer, a function of printing an image through the photo printer, a photo album generating function, a function of providing printing history information regarding the photo printer, and the like.

Figure 9B:
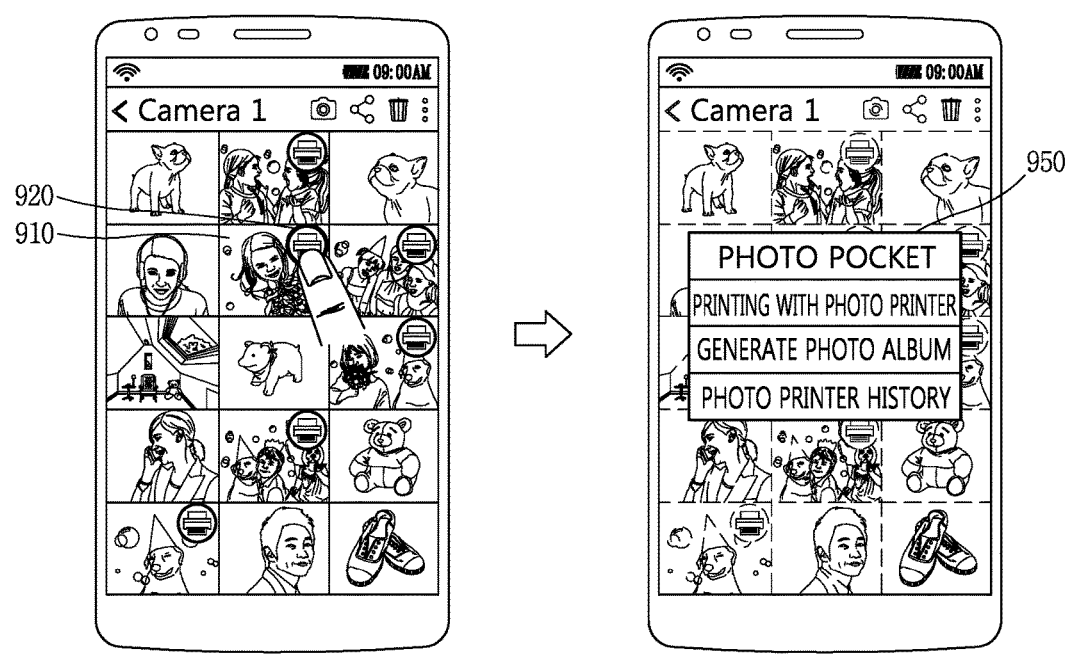

For example, as illustrated in first and second drawings of FIG. 9B, the controller 180 may output a function list 950 including items corresponding to functions associated with the photo printer, in response to a long touch applied to the graphic object 920 indicating the presence of the printing history information through the photo printer.

Therefore, the function list 950 can help the user execute the additional functions using the image corresponding to the thumbnail image 910 output on the area adjacent to the graphic object 920 indicating the presence of the printing history information through the photo printer.

The controller 180 may also execute the function of outputting on the display unit 151 only the thumbnail images of the images including the printing history information through the photo printer, in response to a second touch applied to the graphic object 920 indicating the presence of the printing history information through the photo printer. For example, as illustrated in first and second drawings of FIG. 9C, the controller 180 may control the display unit 151 to output only the thumbnail images of the images including the printing history information through the photo printer, among the plurality of images stored in the memory 170, in response to a downward drag touch applied to the graphic object 920 indicating the presence of the printing history information through the photo printer. Therefore, the user can be provided with a collection of the images including the printing history information through the photo printer.

Figure 9C:
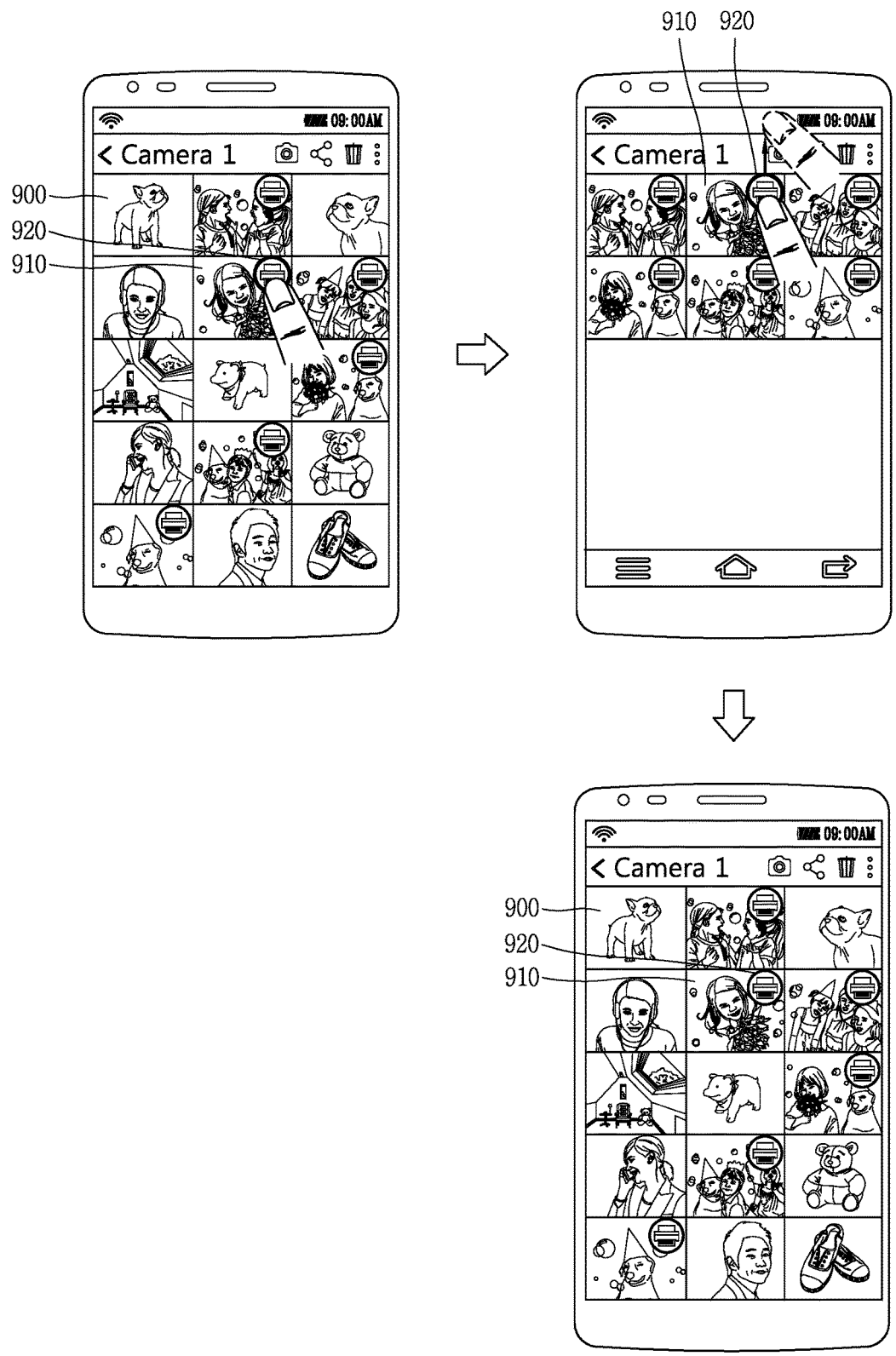
Figure 9D:
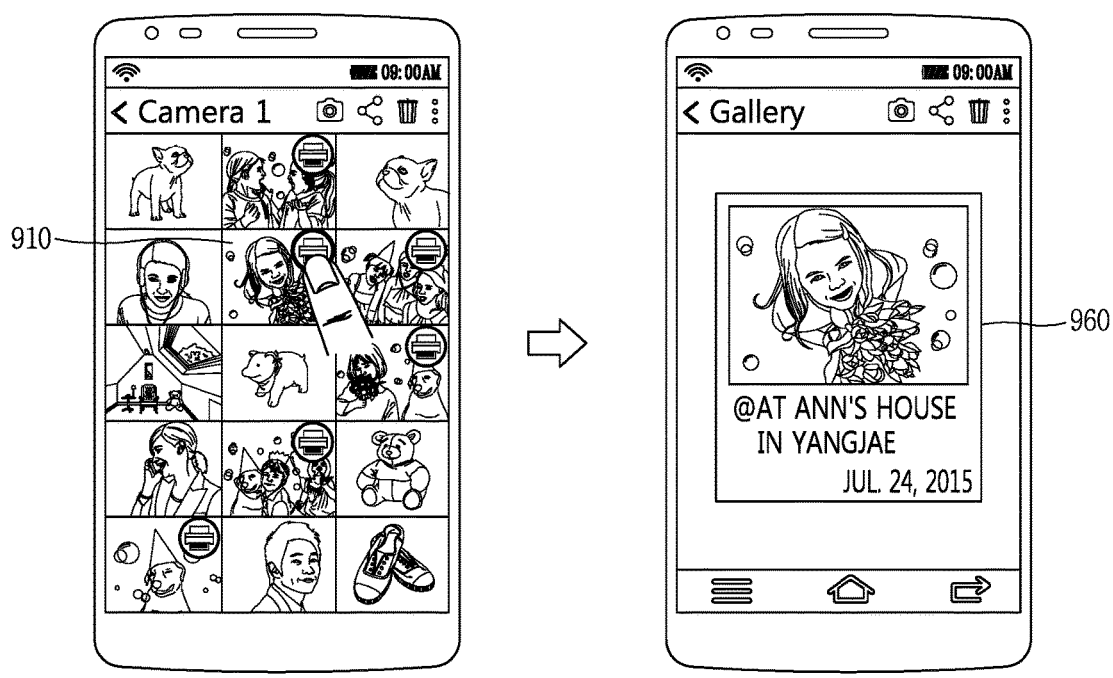

In addition, as illustrated in second and third drawings of FIG. 9C, while only the thumbnail images of the images with the printing history information through the photo printer, the controller 180 may return to a screen output on the display unit 151 before only the thumbnail images of the images with the printing history information through the photo printer are displayed on the display unit 151, in response to an upward drag touch applied to the graphic object 920 indicating the presence of the printing history information through the photo printer. Therefore, the user can be provided with only collected images with the printing history information, or both of the images with the printing history information and images without the printing history information.

When a third touch is applied to the graphic object 920 indicating the presence of the printing history information through the photo printer, the controller 180 may also control the display unit 151 to output a printed state (or a printed shape) through the photo printer with respect to the image corresponding to the thumbnail image 910, which is output on the area adjacent to the graphic object 920 indicating the presence of the printing history information through the photo printer. For example, as illustrated in first and second drawings of FIG. 9D, the controller 180 may control the display unit 151 to output an image 960, which is in a printed shape through the photo printer, of the image corresponding to the thumbnail image 910 output on the area adjacent to the graphic object 920 indicating the presence of the printing history information through the photo printer, in response to a double touch applied to the graphic object 920 indicating the presence of the printing history information through the photo printer. This may allow the user to recognize the printed shape of the image, and also recognize information which has also been printed out upon printing the image.

Although not illustrated, the controller 180 may output both of the image in the printed state and an image in a shape stored in the memory 170 on the display unit 151. This may allow the user to compare the printed shape with the stored shape in the memory.

Although not illustrated, the gallery application may include at least one folder. Here, a folder may be generated according to a preset condition or a user setting. For example, the controller 180 may generate a folder for each application associated with an image.

Each of the at least one folder may include at least one image meeting a different condition. For example, at least one image printed out through the photo printer may be included in one of the at least one folder.

When at least one folder is included in the gallery application, the controller 180 may output the at least one folder on the display unit 151 when the gallery application is executed. Here, when a folder including at least one image printed out through the photo printer is selected from the at least one folder, the controller 180 may output the at least one image printed out through the photo printer on the display unit 151. Accordingly, the user can be provided with only images printed out through the photo printer on the gallery application.

The foregoing description has been given of a method of outputting photo printer-related information, in response to a touch applied to a graphic object indicating presence of printing history information through the photo printer.

Figure 10:
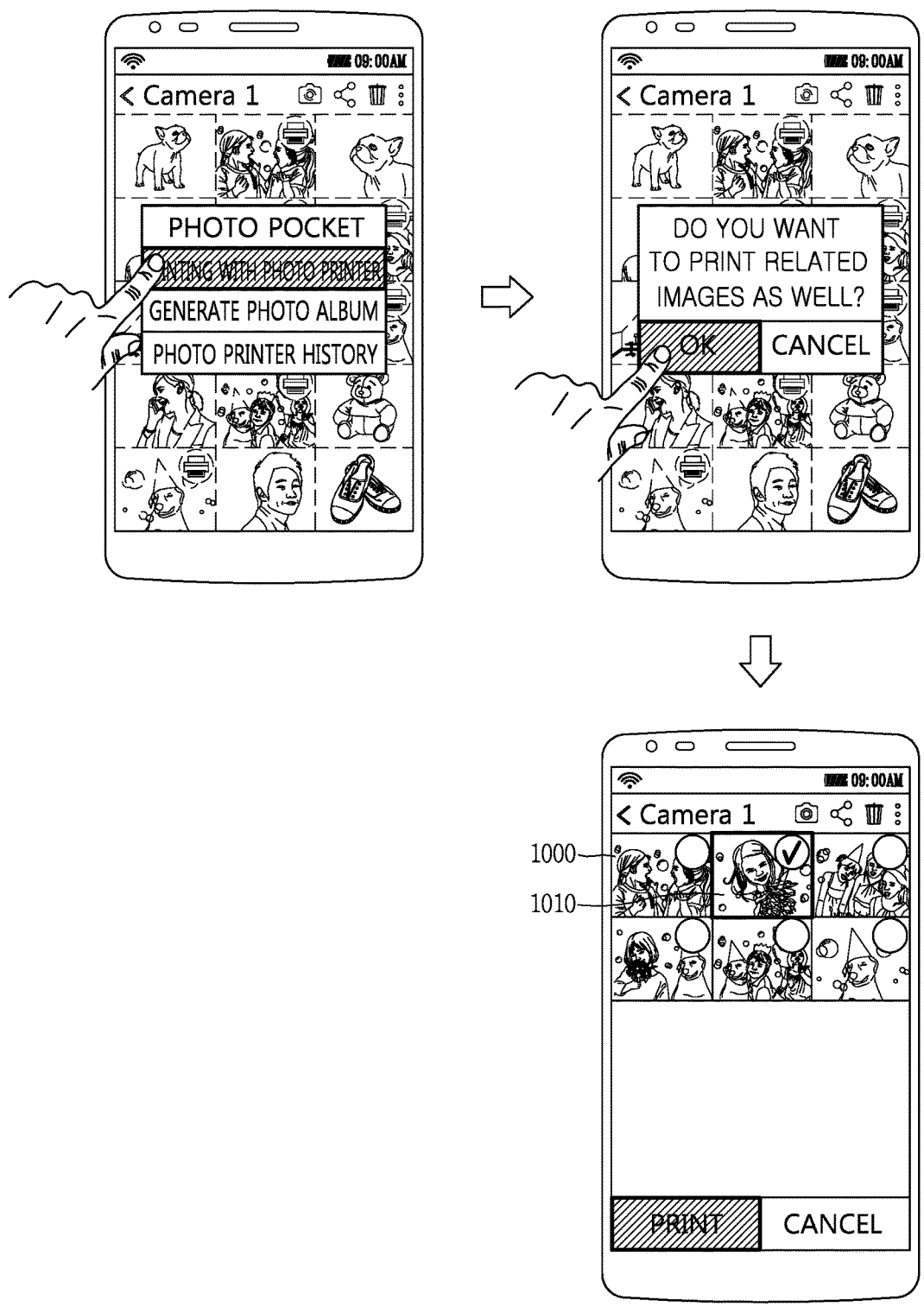
FIG. 10 is a conceptual view illustrating various printing methods when a specific image is printed out through a photo printer.

Hereinafter, description will be given of various printing methods when a specific image is printed out through a photo printer. FIG. 10 is a conceptual view illustrating various printing methods when a specific image is printed out through a photo printer.

When a control command for printing out a specific image through a photo printer is received, the controller 180 of the mobile terminal according to the present invention may transmit an image signal corresponding to the specific image to the photo printer to perform printing.

Meanwhile, upon receiving the control command for printing out the specific image through the photo printer, the controller 180 may detect images associated with the specific image to recommend the related images to the user.

The images associated with the specific image may be detected based on metadata information on the specific image. For example, the images associated with the specific image may be detected based on at least one of captured date, a captured time and a captured place of the specific image.

For example, as illustrated in a first drawing of FIG. 10, the controller 180 may receive a control command for printing out one of a plurality of images stored in the memory 170 through the photo printer. Here, as illustrated in a second drawing of FIG. 10, the controller 180 may output a popup window on the display unit 151 such that the user can select whether or not to detect images associated with the one image.

As illustrated in a third drawing of FIG. 10, when a control command for detecting the images associated with the one image is received, the controller 180 may output images 1000 and 1010 associated with the one image on the display unit 151. Therefore, the user can select at least one image 1010 from the output images and transmit an image signal of the at least one image 1010 to the photo printer. The user can thus print out the associated images at once.

The foregoing description has been given of a method of printing out a specific image along with associated images upon printing out the specific image through a photo printer.

Figure 11:
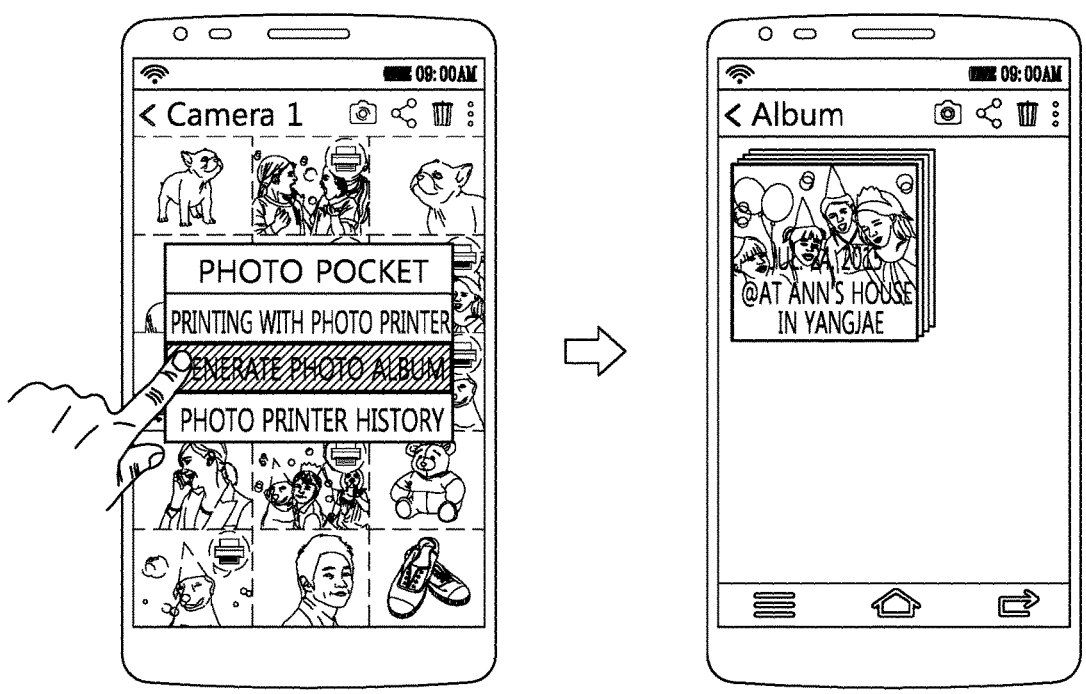
FIG. 11 is a conceptual view illustrating a method of generating a photo album using images printed out through the photo printer in a mobile terminal in accordance with the present invention.

Hereinafter, description will be given of a method of generating a photo album using images printed out through the photo printer. FIG. 11 is a conceptual view illustrating a method of generating a photo album using images printed out through the photo printer in a mobile terminal in accordance with the present invention.

The controller 180 of the mobile terminal according to the present invention may simultaneously provide a user with images printed out through the photo printer in a collecting manner. In addition, the controller 180 may generate a photo album by collecting images printed out through the photo printer.

The photo album may refer to a graphic interface which provides a user with a group of several images in a shape like a photo album.

In more detail, upon receiving a control command for generating a photo album of images printed out through the photo printer, the controller 180 may detect images including printing history information through the photo printer. Afterwards, the controller 180 may generate the photo album based on the detected images. For example, upon receiving the control command for generating the photo album of the images printed out through the photo printer, the controller 180 may generate the photo album using the images printed out through the photo printer. The user can thus view those images printed out through the photo printer in a printed form and also in a digital form.

The foregoing description has been given of a method of generating a photo album of images printed out through a photo printer.

The mobile terminal according to the present invention can provide information related to an image printed out through the photo printer when the image printed out through the photo printer is included in a preview image of a camera. The user can thus recognize that the image has been printed out through the photo printer, and also recognize the information related to the image printed out through the photo printer even without executing a photo printer printing function. This may result in reminding the user the memory associated with the printed image.

The present invention can also provide various functions associated with the photo printer through a graphic object indicating the image printed out through the photo printer, which may allow the user to more intuitively access those functions using the image printed out through the photo printer.

The present invention can provide information related to the photo printer through a gallery application, so as to provide images printed out through the photo printer among a plurality of images stored in the memory 170 in a visually distinguishable manner. Therefore, the user can recognize more intuitively the images printed out through the photo printer.

The present invention can collect and provide only images printed out through the photo printer in the form of an album, which may result in reminding the user the memory associated with the images.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a memory;
a camera;
a display; and
a controller configured to:
cause the display to display a preview image of image data received via the camera; and
cause the display to display an indicator indicating that an image object included in the preview image corresponds to a specific image stored in the memory when the image object corresponds to the specific image,
wherein the specific image has been previously printed out via a printer device,
wherein the controller is further configured to cause the display to display information related to the specific image in response to a touch applied to the indicator.

2. The terminal of claim 1, wherein the information includes at least one of captured place information, captured time information, photo memo information, an image having captured place information that is similar to or same as captured place information of the specific image, an image having captured time information that is similar to or same as captured time information of the specific image, or an image that has been printed out via the printer device.

3. The terminal of claim 1, wherein the controller is further configured to cause the display to display the information in a size that is set based on a length of the touch applied to the indicator.

4. The terminal of claim 3, wherein the controller is further configured to cause the display to display the information and the preview image simultaneously.

5. The terminal of claim 4, wherein the controller is further configured to cause the display to display the information, but to not display the preview image when a second touch is applied to the indicator by a predetermined length while both the information and the preview image are displayed.

6. The terminal of claim 5, wherein the controller is further configured to cause the display to display a graphic object indicating the preview image at one area of the displayed information.

7. The terminal of claim 5, wherein:
the information includes information related to a plurality of images; and
the controller is further configured to cause the display to display one of the plurality of images in place of the preview image when the information is displayed on the display.

8. The terminal of claim 7, wherein the controller is further configured to cause the display to display a second image among the plurality of images in response to a flicking input applied to the one of the plurality of images that is different from the second image.

9. The terminal of claim 1, wherein:
the touch is a downward drag touch applied on the display;
the information relates to a plurality of images; and
the controller is further configured to cause the display to display the indicator moving to select one of the plurality of images in response to a drag input applied to the indicator from one side to another side, the drag input applied while the plurality of images are displayed.

10. The terminal of claim 9, wherein the controller is further configured to cause the display to display additional information related to the selected one of the plurality of images that is located at a position corresponding to a moved position of the dragged indicator.

11. The terminal of claim 1, wherein the controller is further configured to recognize the image object as a product printed out via the printer device when the image object includes identification information relating to the specific image.

12. The terminal of claim 1, wherein the controller is further configure to:
cause the display to display a plurality of thumbnail images corresponding to a plurality of images stored in the memory; and
cause the display to display a graphic object indicating presence of printing history information on at least one of the plurality of thumbnail images that corresponds to at least one of the plurality of images having the printing history information, the printing history information indicating that the at least one of the plurality of images has been previously printed out via the printer device.

13. The terminal of claim 12, wherein the controller is further configured to cause the display to display only one of the at least one of the plurality of thumbnail image in response to a touch applied to the graphic object displayed on the one of the at least one of the plurality of thumbnail images.

14. The terminal of claim 12, wherein the controller is further configured to cause the display to display a function list including items corresponding to additional functions associated with the printer device in response to a touch applied to the displayed graphic object.

15. The terminal of claim 12, wherein the controller is further configured to cause the display to display an image corresponding to one of the plurality of thumbnail images on which the graphic object is displayed in response to a touch applied to the graphic object, the image displayed in a printed format.

16. A method for controlling a mobile terminal, the method comprising:
   receiving image data via a camera;
   displaying, on a display, a preview image of the image data, the preview image including an image object that corresponds to a specific image stored in a memory;
   displaying an indicator indicating that the image object corresponds to the specific image; and
   displaying information related to the specific image in response to a touch applied to the indicator,
   wherein the specific image has been previously printed out via a printer device.

17. The method of claim 16, wherein the displaying of the information comprises displaying the information in a size that is set based on a length of the touch applied to the indicator.

18. The method of claim 17, wherein the information and the preview image are displayed simultaneously.

* * * * *